(12) United States Patent
Chen et al.

(10) Patent No.: US 10,575,009 B2
(45) Date of Patent: Feb. 25, 2020

(54) SYSTEMS, DEVICES AND METHODS FOR VIDEO CODING

(71) Applicant: Hangzhou Hikvision Digital Technology Co., Ltd., Hangzhou (CN)

(72) Inventors: Jie Chen, Hangzhou (CN); Shiliang Pu, Hangzhou (CN); Hai Yu, Hangzhou (CN)

(73) Assignee: Hangzhou Hikvision Digital Technology Co., Ltd., Hangzou (CN)

(*) Notice: Subject to any disclaimer, the term of this patent is extended or adjusted under 35 U.S.C. 154(b) by 646 days.

(21) Appl. No.: 14/995,256

(22) Filed: Jan. 14, 2016

(65) Prior Publication Data

US 2016/0212422 A1  Jul. 21, 2016

(30) Foreign Application Priority Data

Jan. 16, 2015 (CN) .......................... 2015 1 0023066

(51) Int. Cl.
*H04N 19/46* (2014.01)

(52) U.S. Cl.
CPC .................. *H04N 19/46* (2014.11)

(58) Field of Classification Search
CPC ........................................ H04N 19/46
See application file for complete search history.

(56) References Cited

U.S. PATENT DOCUMENTS

| | | | |
|---|---|---|---|
| 4,517,598 A * | 5/1985 | Van Valkenburg | H04N 1/00098 345/213 |
| 5,602,582 A * | 2/1997 | Wanderscheid | H04N 7/17318 348/E7.071 |
| 5,655,117 A * | 8/1997 | Goldberg | G06F 16/71 |
| 5,768,447 A * | 6/1998 | Irani | G11B 27/034 382/305 |
| 5,774,593 A * | 6/1998 | Zick | G06K 9/00711 375/E7.151 |
| 5,864,682 A | 1/1999 | Porter et al. | |
| 6,014,693 A * | 1/2000 | Ito | H04N 7/17336 348/E7.073 |

(Continued)

FOREIGN PATENT DOCUMENTS

CN        1873820 A  * 12/2006
CN      101282472      10/2008
(Continued)

OTHER PUBLICATIONS

U.S. Appl. No. 14/994,270, filed Jan. 13, 2016, Chen et al.
U.S. Appl. No. 14/995,243, filed Jan. 14, 2016, Shen et al.
European Patent Office, Office Action, Application No. 16154511.6, dated Nov. 16, 2018.

(Continued)

*Primary Examiner* — Dave Czekaj
*Assistant Examiner* — Shanika M Brumfield
(74) *Attorney, Agent, or Firm* — Jones Day

(57) ABSTRACT

Systems, devices and methods are provided for video encoding. For example, video data is encoded based at least in part on a preset encoding algorithm to obtain a video encoding stream that comprises a plurality of coding frames. A stream tag is added for the video encoding stream, and a frame tag is added for each coding frame in the video encoding stream. The stream tag includes information characterizing whether the stream tag is added into the video encoding stream. The frame tag includes type information of the coding frame.

10 Claims, 13 Drawing Sheets

(56) References Cited

U.S. PATENT DOCUMENTS

| | | | |
|---|---|---|---|
| 6,453,115 B1 * | 9/2002 | Boyle | G11B 20/10 386/346 |
| 7,016,411 B2 | 3/2006 | Azuma et al. | |
| 9,232,233 B2 * | 1/2016 | Zhou | H04N 19/197 |
| 2002/0168175 A1 * | 11/2002 | Green | H04N 5/783 386/346 |
| 2003/0235400 A1 * | 12/2003 | Nakai | H04N 5/76 386/356 |
| 2006/0117357 A1 * | 6/2006 | Surline | H04N 5/783 725/90 |
| 2006/0120449 A1 * | 6/2006 | Lee | H04N 19/61 375/240.2 |
| 2007/0025687 A1 * | 2/2007 | Kim | G11B 27/005 386/241 |
| 2007/0206872 A1 * | 9/2007 | Song | H04N 19/176 382/236 |
| 2007/0223021 A1 * | 9/2007 | Song | H04N 19/105 358/1.9 |
| 2010/0043038 A1 * | 2/2010 | Li | H04N 21/2368 725/103 |
| 2013/0182774 A1 * | 7/2013 | Wang | H04N 19/46 375/240.24 |
| 2015/0287435 A1 * | 10/2015 | Land | H04N 19/46 386/241 |
| 2017/0078354 A1 * | 3/2017 | Yang | H04N 21/23439 |

FOREIGN PATENT DOCUMENTS

| | | | | |
|---|---|---|---|---|
| CN | 101325681 | | 12/2008 | |
| CN | 101414462 | | 4/2009 | |
| CN | 101702778 | | 5/2010 | |
| CN | 101778294 | | 7/2010 | |
| CN | 102301730 | | 12/2011 | |
| CN | 102325244 A | * | 1/2012 | |
| CN | 102332284 A | * | 1/2012 | |
| CN | 102663005 | | 9/2012 | |
| CN | 103179402 A | | 6/2013 | |
| EP | 2107811 | | 10/2009 | |
| JP | 2003101937 A | * | 4/2003 | |
| JP | 2010187077 A | * | 8/2010 | |
| JP | 5366212 B2 | * | 12/2013 | |
| WO | WO 2007/093199 | | 8/2007 | |
| WO | WO 2010/043140 | | 4/2010 | |
| WO | WO-2014001381 A2 | * | 1/2014 | H04N 19/587 |

OTHER PUBLICATIONS

Pettersson, Martin, Samuelsson, Jonatan, Sjoberg, Rickard, Strom, Jacob, Yu, Ruoyang; HLS: Dependent RAP Indication SEI Message; 18th Meeting—Joint Collaborative Team on Video Coding of ITU-T SG 16 WP3 and ISO/IEC JTC 1/SC 29/WG 11; Jun. 2014.

Petersson, Martin, Samuelsson, Jonatan, Sjoberg, Rickard; HLS: Dependent RAP Indication SEI Message; 19th Meeting—Joint Collaborative Team on Video Coding of ITU-T SG 16 WP 3 and ISO/IEC JTC 1/SC 29/WG 11; Oct. 2014.

Information Technology—Dynamic Adaptive Streaming Over HTTP (DASH)—Part 1: Media presentation description and segment formats; International Standard ISO/IEC 23009-1, 2nd Ed.; May 2014.

Pettersson, Martin, Sjoberg, Rickard, Samuelsson, Jonatan; Dependent Random Access Point Pictures in HEVC; IEEE International Conference on Image Processing; pp. 867-871; Sep. 2015.

Mitic, Richard, Samuelsson, Jonatan, Petersson, Martin, Sjoberg, Rikard; DRAP Sample Group in the ISOMBFF; Motion Picture Expert Group Meeting; Geneva, Switzerland Feb. 2015.

Samuelsson, Jonatan, Mitic, Richard, Pettersson, Martin, Sjoberg, Rickard; DRAP Sample Group in the ISOBMFF; Motion Picture Expert Group Meeting; Geneva, Switzerland; Oct. 2015.

Chinese Search Report dated Apr. 25, 2018 in connection with CN2015100230667 (English translation included).

Chinese Supplemental Search Report dated Mar. 24, 2019 in connection with CN2015100230667 (English translation included).

Chinese Office Action dated May 4, 2018 in connection with CN2015100230667 (English translation included).

Chinese Office Action dated Jan. 2, 2019 in connection with CN2015100230667 (English translation included) CN2015100240599.

European Patent Office; European Communication pursuant to Article 94(3) dated May 13, 2019 in connection with EP16154511.

European Patent Office; European Search Report and European Search Opinion dated Nov. 2, 2016 in connection with EP16154511.

European Patent Office, Examination Report, Application No. 16154511. 6, dated May 13, 2019.

Singer, David; Random Access in 14496-12, the ISO Base Media File Format; International Organisation for Standardisation, Coding of Moving Pictures and Audio; Mar. 2011.

Li M et al., "Proposed updates to PDAM4—Transport of HEVC video over MPEG-2 Systems," 104. MPEG Meeting; Apr. 22, 2013-Apr. 26, 2013; Incheon; (Motion Picture Expert Group or ISO/IEC JTC1/SC29/WG11), No. m29207, Apr. 15, 2013 (Apr. 15, 2013), XP030057738.

* cited by examiner

SYSTEMS, DEVICES AND METHODS FOR VIDEO CODING

CROSS-REFERENCES TO RELATED APPLICATIONS

The application claims priority to Chinese Patent Application No. 201510023066.7, filed Jan. 16, 2015, incorporated by reference herein for all purposes.

BACKGROUND

Video encoding is a process to encode a dynamic picture and digitize an analog picture signal. The video encoding process can realize picture band compression, reduce or eliminate information redundancy between digital pictures, and make video transmission channel capacity smaller than the channel capacity during analog transmission.

The video encoding is achieved by a video encoder generally. Traditional video encoders usually categorize coding frames (e.g., for encoding and decoding) into three types: I Frame, P Frame and B Frame. I Frame is a frame type specified in video encoding and decoding standards. I Frame employs an intra-frame prediction encoding mode, and data of a picture is completely preserved. I Frame is an independent individual frame with all the data of the picture. During a decoding process, I Frame can be independently decoded into a single frame of picture, and the decoding process of an I Frame is independent of other frames.

P Frame is a forward prediction frame. P Frame does not include data of a complete picture, but includes a difference between the P Frame and a preceding I Frame or a preceding P Frame. During a decoding process, a final picture is generated by superimposing the preceding I Frame or the preceding P Frame with the current P Frame.

B Frame is a bi-directional difference frame, and records differences between the current B Frame and preceding and subsequent frames. During a decoding process, not only a preceding picture but also a subsequent picture are obtained, and superimposed with the differences between the current B Frame and preceding and subsequent frames to obtain a final picture.

FIG. 1 is an example diagram showing a reference relationship among I Frame, P Frame and B Frame. "I" represents I Frame, "B" represents B Frame, and "P" represents P Frame. I Frame may be decoded into a complete picture by itself, without reference to any other frames. P Frame is a forward prediction frame, and refers to a preceding B Frame or a preceding I Frame. B Frame is a bi-directional difference frame, and refers to a preceding frame and a subsequent frame. Thus, a P Frame and a B Frame both need to refer to other frames, and have dependency on other frames. A P Frame or a B Frame cannot be decoded into a complete picture solely by itself. Usually, an I Frame together with a P frame and a related B frame are jointly referred to as a Group of Pictures (GOP).

A picture frame in a video encoding stream may be accessed randomly. An I Frame in a GOP that includes a target frame is located, and then all I Frames, P Frames and B Frames before the target frame are decoded sequentially to achieve random access of the target frame. However, a large number of coding frames often exist in the video encoding stream. Particularly, to decode P Frames and/or B Frames, other frames are often referred to. Thus, to achieve random access of a target frame, a large number of coding frames may have to be decoded, so that cost of decoding is very high and the decoding efficiency is low.

Hence it is highly desirable to improve the techniques for video coding.

BRIEF SUMMARY

According to one embodiment, a method is provided for video encoding. For example, video data is encoded based at least in part on a preset encoding algorithm to obtain a video encoding stream that comprises a plurality of coding frames. A stream tag is added for the video encoding stream, and a frame tag is added for a coding frame in the video encoding stream. The stream tag includes information characterizing whether the stream tag is added into the video encoding stream. The frame tag includes type information of the coding frame.

According to another embodiment, a method is provided for video index storage. For example, a video encoding stream is obtained to determine whether the video encoding stream includes a stream tag. In response to the video encoding stream including the stream tag, whether one or more coding frames in the video encoding stream have frame tags is determined. In response to the video encoding stream including one or more frame tags for the one or more coding frames, the one or more frame tags in the video encoding stream are read to obtain I Frame information and refreshment P Frame information in the video encoding stream. In response to the video encoding steam not including the stream tag, the video encoding stream is analyzed to determine a type of a coding frame in the video encoding steam and at least the I Frame information is obtained. In response to the video encoding stream including the stream tag but not frame tags, the video encoding stream is analyzed to determine the type of the coding frame in the video encoding steam and at least the I Frame information is obtained. One or more indices for storage are created based on the I Frame information and the refreshment P Frame information.

According to yet another embodiment, a method is provided for video access. For example, a target frame and one or more coding frames referred to by the target frame are located using one or more indices that are created for a video encoding stream in advance based at least in part on target frame information in an access request. The one or more coding frames referred to by the target frame include at least one of the following: an I Frame, a refreshment P Frame, and a common P Frame. The target frame, the one or more coding frames referred to by the target frame, and other coding frames between the one or more coding frames referred to by the target frame and the target frame are obtained from the video encoding stream. The target frame, the one or more coding frames referred to by the target frame and the other coding frames between the one or more coding frames referred to by the target frame and the target frame are returned.

In one embodiment, a device for video encoding includes: an encoding module configured to encode video data based on a preset encoding algorithm to obtain a video encoding stream that comprises a plurality of coding frames; and a tag module configured to add a stream tag for the video encoding stream, and add a frame tag for a coding frame in the video encoding stream. The stream tag includes information characterizing whether the stream tag is added into the video encoding stream; and the frame tag includes type information of the coding frame.

In another embodiment, a device for video index storage includes: a first determination module configured to obtain a video encoding stream to determine whether the video encoding stream includes a stream tag; a second determination module configured to, in response to the video encoding stream including the stream tag, determine whether one or more coding frames in the video encoding stream have frame tags; a first acquisition module configured to, in response to the video encoding stream including one or more frame tags for the one or more coding frames, read the one or more frame tags in the video encoding stream to obtain I Frame information and refreshment P Frame information in the video encoding stream; a second acquisition module configured to: in response to the video encoding steam not including the stream tag, analyze the video encoding stream to determine a type of a coding frame in the video encoding steam; and obtain at least the I Frame information; in response to the video encoding stream including the stream tag but not frame tags, analyze the video encoding stream to determine the type of the coding frame in the video encoding steam; and obtain at least the I Frame information; and an index creation module configured to create one or more indices for storage based on the I Frame information and the refreshment P Frame information.

In yet another embodiment, a device for video access includes: a locating module configured to locate a target frame and one or more coding frames referred to by the target frame using one or more indices that are created for a video encoding stream in advance based at least in part on target frame information in an access request; wherein the one or more coding frames referred to by the target frame include at least one of the following: an I Frame, a refreshment P Frame, and a common P Frame; an acquisition module configured to obtain the target frame, the one or more coding frames referred to by the target frame, and other coding frames between the one or more coding frames referred to by the target frame and the target frame in the video encoding stream; and a return module configured to return the target frame, the one or more coding frames referred to by the target frame and the other coding frames between the one or more coding frames referred to by the target frame and the target frame.

According to one embodiment, a system for video encoding includes: one or more data processors; and one or more non-transitory computer-readable storage media encoded with instructions for commanding the data processors to execute operations including: encoding video data based at least in part on a preset encoding algorithm to obtain a video encoding stream that comprises a plurality of coding frames; adding a stream tag for the video encoding stream; and adding a frame tag for a coding frame in the video encoding stream. The stream tag includes information characterizing whether the stream tag is added into the video encoding stream; and the frame tag includes type information of the coding frame.

According to another embodiment, a system for video index storage includes: one or more data processors; and one or more non-transitory computer-readable storage media encoded with instructions for commanding the data processors to execute operations including: obtaining a video encoding stream to determine whether the video encoding stream includes a stream tag; in response to the video encoding stream including the stream tag, determining whether one or more coding frames in the video encoding stream have frame tags; in response to the video encoding stream including one or more frame tags for the one or more coding frames, reading the one or more frame tags in the video encoding stream to obtain I Frame information and refreshment P Frame information in the video encoding stream; in response to the video encoding steam not including the stream tag, analyzing the video encoding stream to determine a type of a coding frame in the video encoding steam and obtaining at least the I Frame information; in response to the video encoding stream including the stream tag but not frame tags, analyzing the video encoding stream to determine the type of the coding frame in the video encoding steam and obtaining at least the I Frame information; and creating one or more indices for storage based on the I Frame information and the refreshment P Frame information.

According to yet another embodiment, a system for video access includes: one or more data processors; and one or more non-transitory computer-readable storage media encoded with instructions for commanding the data processors to execute operations including: locating a target frame and one or more coding frames referred to by the target frame using one or more indices that are created for a video encoding stream in advance based at least in part on target frame information in an access request; wherein the one or more coding frames referred to by the target frame include at least one of the following: an I Frame, a refreshment P Frame, and a common P Frame; obtaining the target frame, the one or more coding frames referred to by the target frame, and other coding frames between the one or more coding frames referred to by the target frame and the target frame in the video encoding stream; and returning the target frame, the one or more coding frames referred to by the target frame and the other coding frames between the one or more coding frames referred to by the target frame and the target frame.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
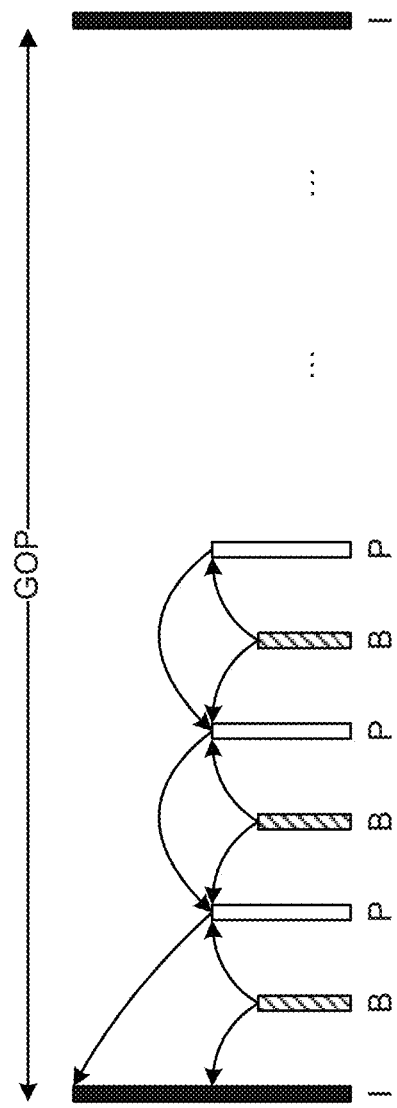
FIG. 1 is an example diagram showing a reference relationship among I Frame, P Frame and B Frame.
Figure 2:
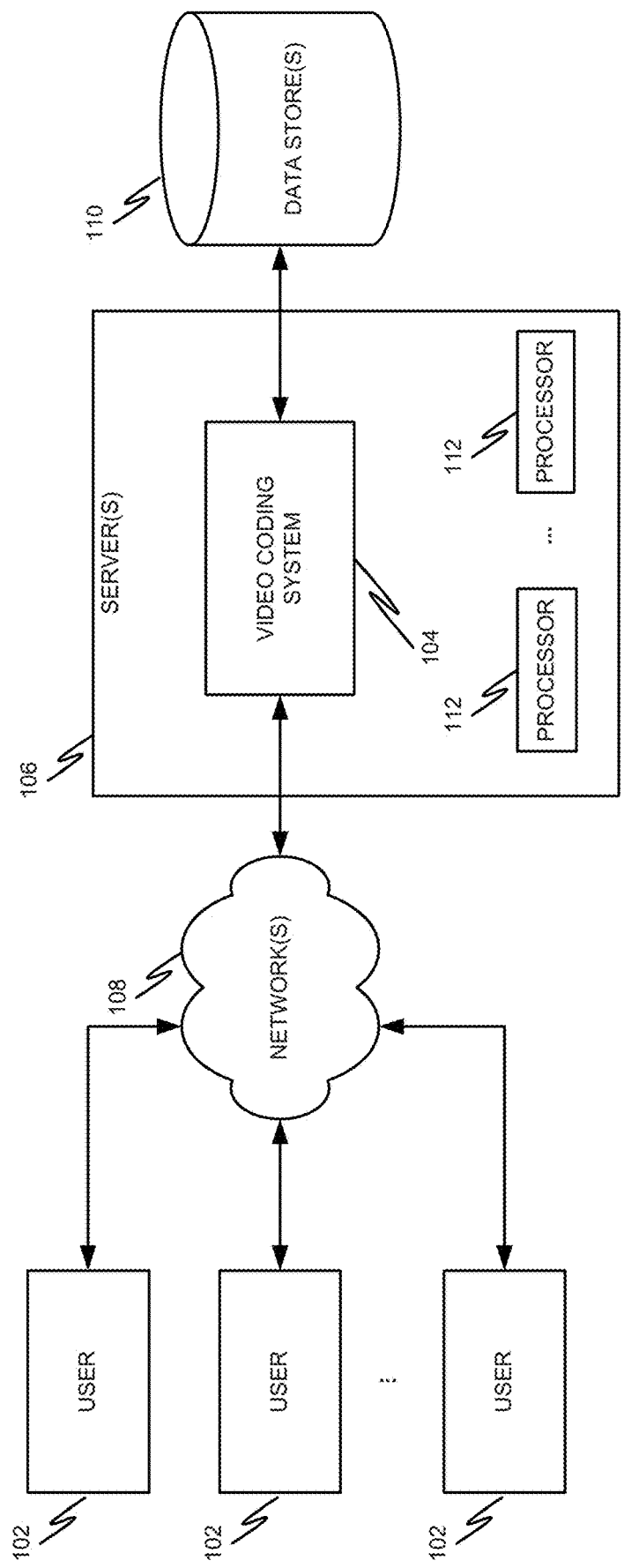
FIG. 2 is an example computer-implemented environment wherein users can interact with a video coding system hosted on one or more servers through a network, according to one embodiment of the present invention.

FIG. 2 is an example computer-implemented environment wherein users 102 can interact with a video coding system 104 hosted on one or more servers 106 through a network 108, according to one embodiment of the present invention. As shown in FIG. 2, the users 102 can interact with the video coding system 104 through a number of ways, such as over one or more networks 108. One or more servers 106 accessible through the network(s) 108 can host the video coding system 104. The one or more servers 106 can also contain or have access to one or more data stores 110 for storing data for the video coding system 104. The one or more servers 106 implement one or more data processors 110. For example, the data processors 110 can be configured for parallel computing.

The video coding system 104 can assist the users 102 to implement an encoding algorithm to change coding frames and related reference relation to improve video data coding. For example, the video coding system 104 can obtain an encoding stream having an I Frame, a common P Frame and a refreshment P Frame for tagging the stream and/or the coding frames to reduce the bit rate. The video coding system 104 can create one or more indices for the encoding stream in advance for storage so as to quickly establish indices and directly locate a target frame. The video coding system 104 can locate the target frame quickly, and obtain the target frame and coding frames referred to by the target frame, but not any coding frames that are not referred to by the target frame, so as to reduce the cost of decoding. Furthermore, the video coding system 104 can obtain a video encoding stream after the changes to encoding, and add a stream tag and frame tags to the video encoding stream and coding frames in the stream respectively so as to differentiate coding frames quickly and create related indices. Thus, efficiency of quick random access and index creation can be improved, the entire process can be simplified, and the speed of locating frames can be increased.

Figure 3:
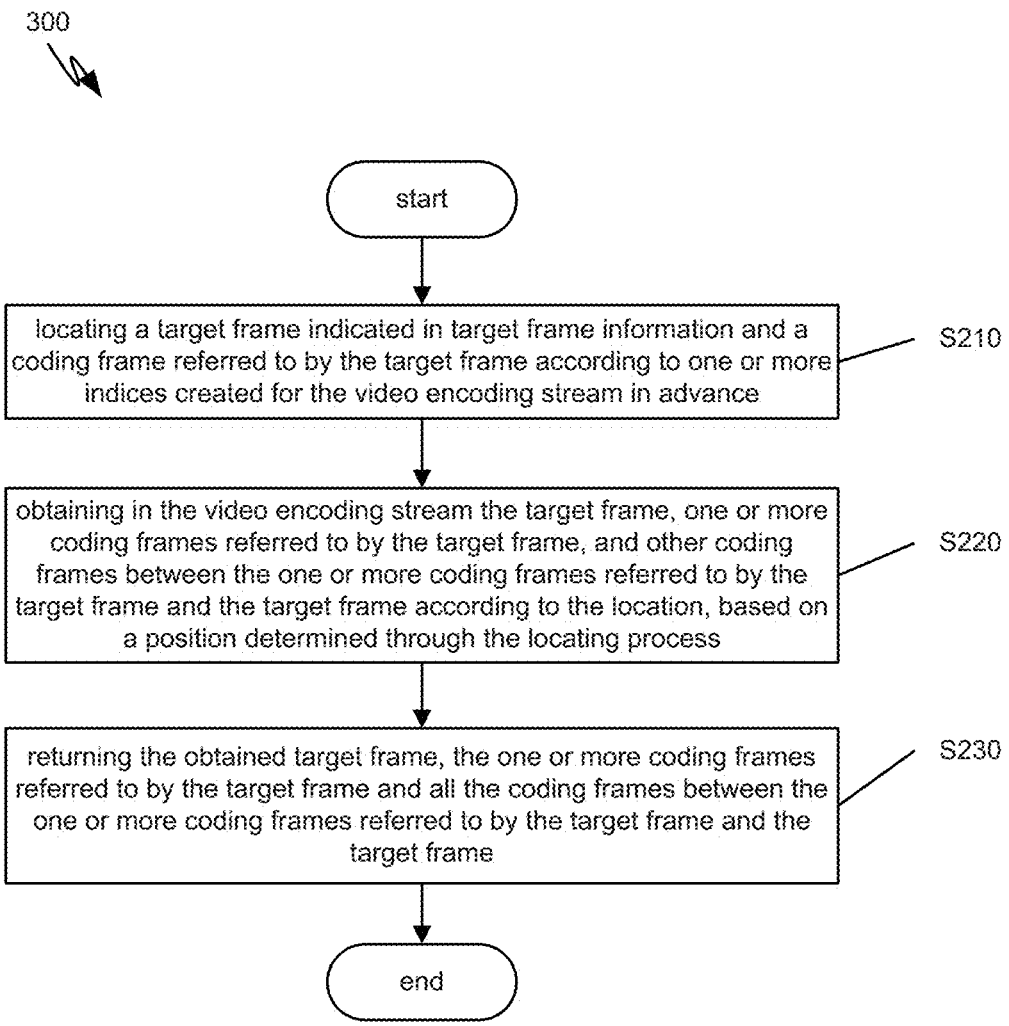
FIG. 3 is an example flow diagram showing a method for accessing a video encoding stream according to one embodiment of the present invention.

FIG. 3 is an example flow diagram showing a method for accessing a video encoding stream according to one embodiment of the present invention. For example, the video coding system 104 implements an encoding algorithm to generates a video encoding stream that includes frames of the following types:

I Frame: an independent frame with picture data. An I Frame can be encoded independently by using an intra-frame prediction encoding algorithm in an encoding process, and the encoding process of the I Frame is independent of other pictures.

Refreshment P Frame: a forward prediction reference frame. A forward first intra-frame prediction encoding algorithm is employed in the encoding process. A reference frame of a refreshment P Frame is a preceding I Frame closest to the refreshment P Frame. Since intra-frame prediction of the refreshment P Frame refers to the I Frame rather than the preceding P Frame, quick search and quick decoding may be achieved during random access or video playback, and the decoding wait time is shortened.

Common P Frame: a forward prediction reference frame. A forward second intra-frame prediction encoding algorithm is employed in the encoding process. A reference frame of the common P Frame is a preceding coding frame adjacent to the common P Frame, and/or a preceding I Frame closest to the common P Frame.

Group of pictures (GOP): the video encoding stream comprises a plurality of GOPs. Each GOP comprises a plurality of coding frames having reference relation. A GOP here is a picture set including an I Frame, as well as a refreshment P Frame and a common P Frame that follow the I Frame and have direct or indirect reference relation with the I Frame.

Figure 8:
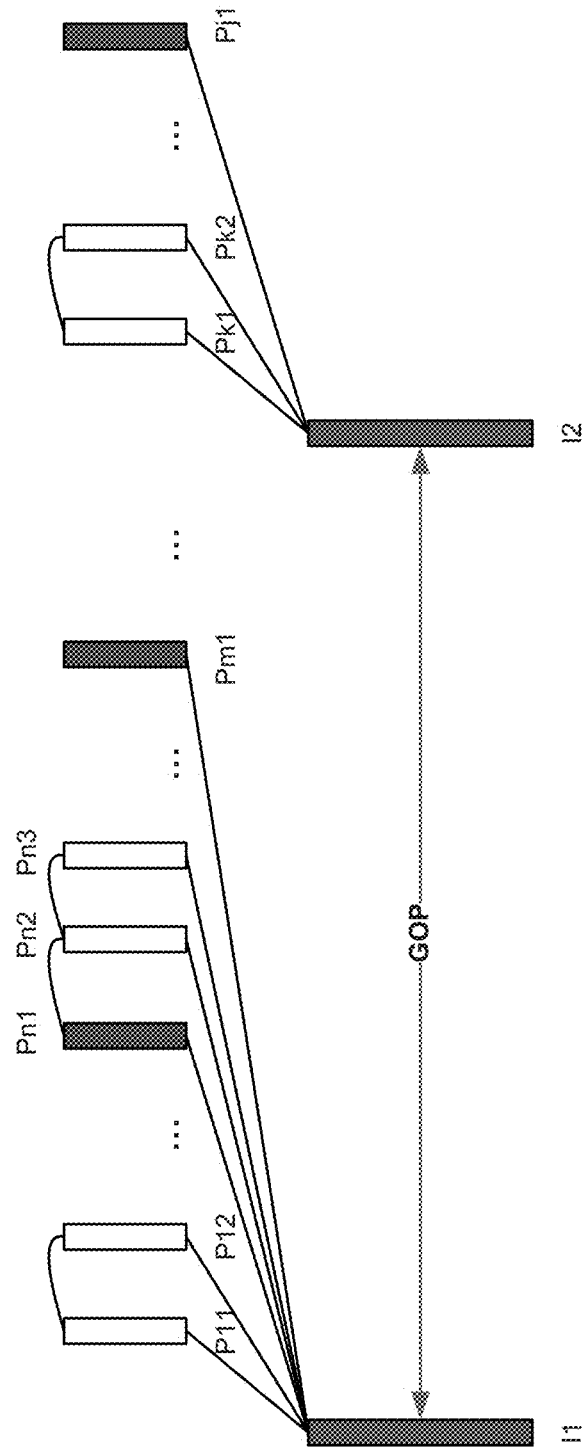
FIG. 8 is an example diagram showing a video encoding stream according to one embodiment of the present invention.

For example, as shown in FIG. 8, in a GOP, a reference I Frame has direct or indirect reference relation with a refreshment P Frame and a common P Frame. For example, the GOP comprises at least one I Frame. As shown in FIG. 8, the interval between two I Frames (e.g., between I1 and I2) is relatively large. Refreshment P Frames may appear between the two I Frames at intervals, and are decoded only with reference to the I Frames in the GOP. Common P Frames which are small in data size are distributed between the refreshment P Frames. For the stream as shown in FIG. 8, one I Frame may appear every few minutes, thereby reducing the bit rate (coding frequency).

Referring back to FIG. 3, the method 300 includes multiple processes. For example, the process S210 includes locating a target frame indicated in target frame information and a coding frame referred to by the target frame according to one or more indices created for the video encoding stream in advance. The one or more coding frames referred to by the target frame comprise an I Frame, a refreshment P Frame of the I Frame, and/or a common P Frame. The target frame information may be an access request from a front end.

Figure 5:
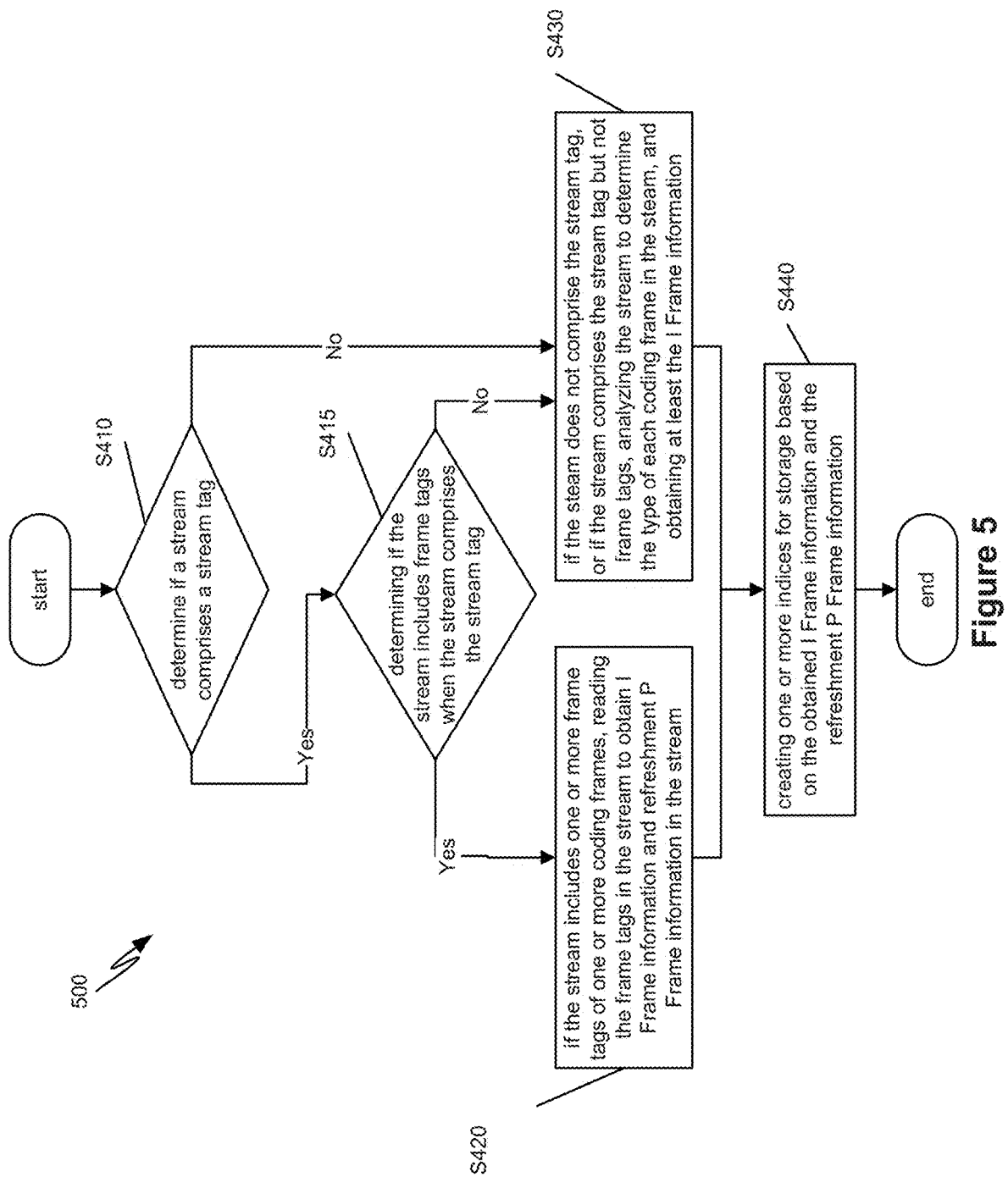
FIG. 5 is an example flow diagram showing a method for index storage a video encoding stream according to one embodiment of the present invention.

In some embodiments, the video coding system 104 creates the one or more indices for quickly locating the target frame to be accessed in the video encoding stream. For example, before the video encoding stream is accessed to obtain the target frame, the video coding system 104 creates the one or more indices for the video encoding stream by analyzing the different types of frames in the stream or using tags added for different coding frames in advance during encoding (e.g., as shown in FIG. 5). Then, the target frame and the coding frames that are directly or indirectly referred to by the target frame are located quickly using the one or more indices. For example, index records of the coding frames are found, and relevant positions of the coding frames in the video encoding stream are determined based on the index records so as to achieve quick coding frame access and extraction and improve the location and access efficiency.

Figure 4:
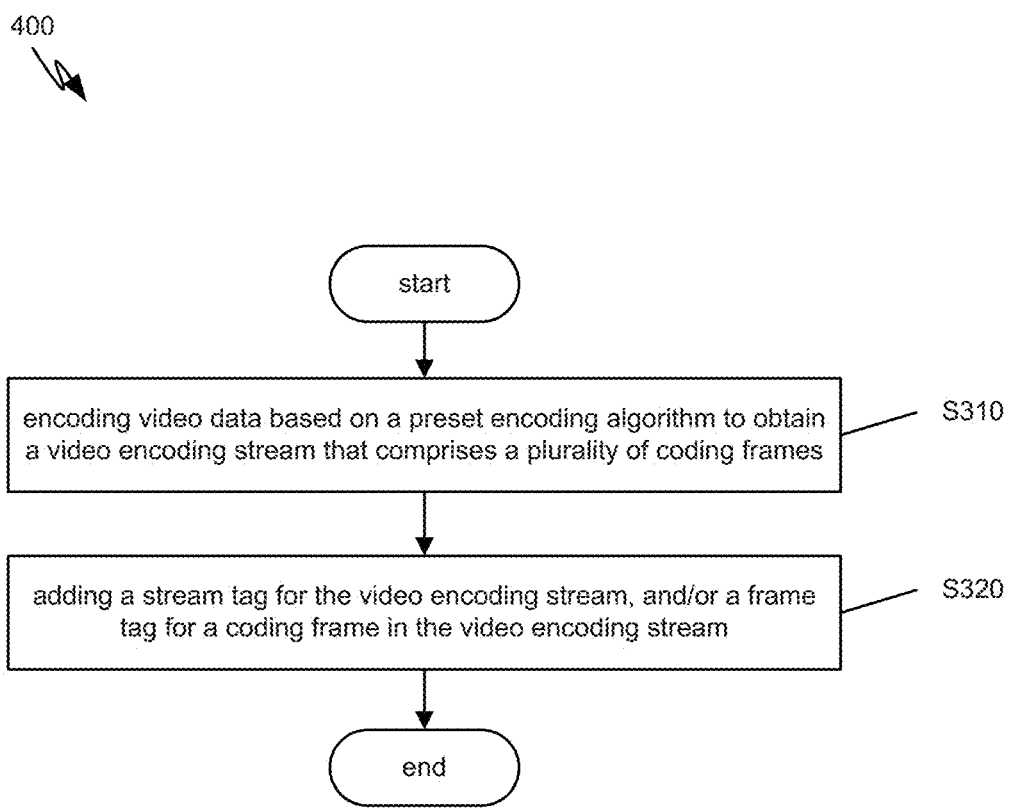
FIG. 4 is an example flow diagram showing a method for encoding a video encoding stream for quick access of the video encoding stream according to one embodiment of the present invention.

In certain embodiments, specific encoding stream processing may be carried out on video data before the creation of the indices to access the video encoding stream quickly. For example, auxiliary information, such as a stream tag and one or more type tags (e.g., frame tags or frame type tags), is added to a video package layer after the video data is encoded using an encoding algorithm, in order to identify or differentiate the video encoding stream and different coding frames in the stream (e.g., as shown in FIG. 4). If the video encoding stream and the different types of coding frames in the stream have definite identification tags, the coding frames can be differentiated and recorded quickly, so that certain coding frames to be accessed can be determined/identified quickly and indices may be created quickly to further simplify the entire process and improve efficiency. The above-noted video data encoding and index creation processes will be described in detail below.

A target frame is a target coding frame to be accessed. For example, a video encoding stream is obtained. An access request is sent for the video encoding stream, or an access request is sent for accessing a particular frame in the stream (e.g., certain picture data). The access request may include, for example, a playback request, a play request, etc. A target frame may include an I Frame, a refreshment P Frame, or a common P Frame. A coding frame referred to by the target frame may comprise an I Frame, a refreshment P Frame, and/or a common P Frame. Further, if the target frame is an I Frame, the one or more coding frames referred to by the target frame is an I Frame itself.

One or more indices may include records (e.g., index records) of each frame, and information in the records may comprise position information of each frame in the video encoding stream. Further, appropriate records can be found in the one or more indices quickly according to a type tag of each frame, and the position information in the stream is obtained based on the records, thereby improving the locating efficiency and the efficiency of obtaining appropriate frames in the stream. For example, relevant information of each I Frame (I Frame information) in the index record comprises frame information (e.g., the frame type, a timestamp, an identification number of the I Frame, etc.), position information (e.g., position information of the I Frame in the video encoding stream), length information, etc. In some embodiments, the I Frame information does not comprise content or data of the I Frame. For example, relevant information of each refreshment P Frame (refreshment P Frame information) in the index record comprises frame information (e.g., the frame type, a timestamp, an identification number of the refreshment P Frame, etc.), offset of the refreshment P Frame from a related I Frame (e.g., position information of the refreshment P frame in the stream), length of the refreshment P Frame, the related I Frame, and the length of the related I Frame. In certain embodiments, the refreshment P Frame information does not comprise content or data of the refreshment P Frame.

In specific embodiments, the locating process may be carried out using a location algorithm (e.g., a bisection method, a sequential search method, etc.). For example, a closest I Frame or a refreshment P Frame can be located based on target frame information in an access request that includes index records, e.g., frame type, frame position, frame identification number and frame timestamp, etc.

Referring back to FIG. 3, the process S220 includes obtaining in the video encoding stream the target frame, one or more coding frames referred to by the target frame, and other coding frames between the one or more coding frames referred to by the target frame and the target frame according to the location, based on a position determined through the locating process. For example, the video encoding stream can be stored in a data storage end (e.g., a server, a cloud).

In some embodiments, frame records in the one or more indices include information associated with the position of the target frame and the positions of the one or more coding frames referred to by the target frame in the stream. The records (e.g., the index records) of the frames in the indices are located according to the indices created in advance. Then, the positions of the frames in the video encoding stream, such as the position of the target frame and the position of the one or more coding frames referred to by the target frame, can be determined according to, for example, the frame information or other related information in the records. The target frame is then obtained at the position of the target frame and the coding frame is obtained at the position of the coding frame in the accessed stream. For example, if the requested target frame is an I Frame, records of a closest I Frame that is indicated in the target frame information (e.g., a frame identification number and a timestamp) can be located. Then, the I Frame is read from the appropriate position in the stream according to the position and length of the I Frame, and one or more P Frames after the length range of the I Frame are also read.

The process S230 includes returning the obtained target frame, the one or more coding frames referred to by the target frame and all the coding frames between the one or more coding frames referred to by the target frame and the target frame. For example, the one or more coding frames referred to by the target frame and the target frame can be decoded in sequence at the front end for requesting the access according to the order of the target frame and the one or more coding frames referred to by the target frame in the video encoding stream. For the sequential decoding, for example, the I Frame corresponding to the obtained target frame and then the obtained target frame (including other types of coding frames related to the target frame, and the target frame itself) are decoded. Particularly, for example, if the target frame is an I Frame, the I Frame is decoded first, and then the later data is decoded; or if the target frame is the refreshment P Frame, the reference frame (the closest frame I) of the refreshment P Frame is read and decoded, and then the refreshment P Frame and the later data are read and decoded. Therefore, the decoded target frame can be obtained, and the purpose of accessing to the target frame of the video encoding stream is achieved.

In some embodiments, the process S210 relates to back-end encoding, and storage processing of an intermediate storage end. The process S220 relates to storage access to the intermediate storage end, and the process S230 relates to front-end reading and encoding. In specific embodiments, the back end encoding, the intermediate end storage and the front end access involved in the systems, devices and/or methods (e.g., the method 200, the method 300) can be implemented at a same side. For example, encoding, data storage and access end can be carried out on a same server or a same terminal. In another example, encoding, data storage and access can be carried out at three different sides respectively; or two of the processes of encoding, data storage and access are carried at one side, while the other is carried out at the other side. In certain embodiments, the systems, devices and/or methods described herein can be configured for remote storage, local storage, remote access (e.g., play and playback) and/or local access (e.g., play and playback), other real-time equipment access, etc., and are not limited to any specific data code stream storage and processing equipment.

For convenience of description of embodiments below, an access end for accessing to a video encoding stream is assumed to be on a terminal side (e.g., access decoding), and a back end for encoding and an intermediate end for index storage are assumed to be on a server side (e.g., data generation and storage).

FIG. 4 is an example flow diagram showing a method for encoding a video encoding stream for quick access of the video encoding stream according to one embodiment of the present invention. For example, the video coding system 104 implements the method 400 to change video data encoding (e.g., coding frames) and stream generation to reduce a bit rate of a video encoding stream to be accessed and decoding cost.

The process S310 includes encoding video data based on a preset encoding algorithm to obtain a video encoding stream that comprises a plurality of coding frames. Particularly, the video data is encoded by the preset encoding algorithm on a video encoding layer, and the video encoding stream that comprises coding frames is obtained. Further, the video encoding stream comprises a plurality of groups of pictures (GOPs). Each GOP is a picture set including an I Frame, as well as a refreshment P Frame and a common P Frame that follow the I Frame and have direct or indirect reference relation with the I Frame. As shown in FIG. 8, the video encoding stream may comprise a plurality of GOPs, and each GOP may comprises a number of coding frames having reference relation, wherein the coding frames include I Frame, common P Frame and refreshment P Frame.

In some embodiments, picture data in the video data is encoded using an intra-frame prediction encoding algorithm to obtain an I Frame. As an example, the picture data in the video data is encoded using a first intra-frame prediction encoding algorithm, and a refreshment P Frame is obtained, wherein the refreshment P Frame refers to the closest I Frame located before the refreshment P Frame. As another example, the picture data in the video data is encoded using a second intra-frame prediction encoding algorithm, and a common P Frame is obtained, wherein the common P Frame refers to a preceding coding frame adjacent to the common P Frame, and/or the closest I Frame located before the common P Frame. The generated stream may comprise the I Frame that is obtained after encoding with reference to itself, the refreshment P Frame that is obtained after encoding with reference to the closest I Frame located before the refreshment P Frame, the common P Frame that is obtained after encoding with reference to the preceding frame adjacent to the common P Frame, and the closest I Frame located before the common P Frame.

In specific embodiments, the intra-frame prediction encoding algorithm, the first intra-frame prediction encoding algorithm and the second intra-frame prediction encoding algorithm may correspond to certain known algorithms. However, in the video data encoding stream obtained using a video data encoding algorithm, the refreshment P Frame refers to the closest I Frame located before the refreshment P Frame, and the common P Frame refers to the preceding coding frame adjacent to the common P Frame and/or the closest I Frame located before the common P Frame, according to some embodiments.

The process S320 includes adding a stream tag for the video encoding stream, and/or a frame tag for each coding frame in the video encoding stream. In one embodiment, auxiliary data information may be added on a video package layer. For example, the stream tag is added for the video encoding stream, and/or the frame tag is added for each coding frame in the video encoding stream, wherein the frame tags may comprise type information of the coding frames. When the stream and the coding frames are determined to have respective tags, types of the coding frames may be identified after the frame tags of the coding frames are read.

For example, the stream tag may be set as 0 to indicate that the video encoding stream has been encoded according to the systems, devices and/or methods described herein. The frame tag may be set as 1 for the I Frame, the frame tag may be set as 2 for the common P Frame, and the frame tag may be set as 3 for the refreshment P Frame. Thus, the types of the coding frames may be differentiated and whether the stream is decoded using the systems, devices and/or methods described herein.

The auxiliary information may further comprise information characterizing whether a stream tag is added to the stream. When a packaging layer of the video encoding stream is read, the stream can be determined quickly, and the types of the coding frames can be identified quickly, so as to create one or more indices of the video encoding stream to be accessed more quickly and simplify the process.

FIG. 5 is an example flow diagram showing a method for index storage a video encoding stream according to one embodiment of the present invention. For example, the video coding system 104 implements the method 500 to create one or more indices for a video encoding stream before access to the stream or the obtained target frame to quickly locate the target frame in the video encoding stream based on the one or more indices. Thus, the stream access can be simplified, and the access speed and even the decoding speed can be increased. The decoding cost is further reduced, and the decoding efficiency is improved.

As shown in FIG. 5, the process S410 includes obtaining a video encoding stream to determine whether the stream comprises a stream tag. As an example, the video encoding stream (e.g., a video encoding stream to be accessed) may be obtained from remote equipment, local equipment or real-time equipment. As another example, the video encoding stream may be obtained from certain access requests (e.g., play, playback).

In some embodiments, the video coding system 104 determines whether a packaging layer of the video encoding stream comprises a stream tag so as to determine whether the video encoding stream is generated using the encoding method described herein (e.g., the method 400 as shown in FIG. 4). If the packaging layer comprises a stream tag, the video encoding stream is generated using the encoding method described herein, and the stream comprises coding frames (e.g., an I Frame, a refreshment P Frame and a common P Frame) generated according to the encoding method described herein.

For example, if the stream tag exists in the video packing layer and is 0, the video encoding stream is generated using the encoding method described herein. If the stream tag does not exist in the packing layer, the video encoding stream is not generated using the encoding method described herein, and maybe generated using an encoding method (e.g., a conventional encoding method) other than the method described herein.

The process S415 includes determining whether one or more coding frames in the stream have frame tags if the stream comprises the stream tag. If the stream comprises the stream tag, the stream is generated using the encoding method described herein, and then whether the frame tags are added for the coding frames is determined.

The process S420 includes: if the stream includes one or more frame tags of one or more coding frames, reading the frame tags in the stream to obtain I Frame information and refreshment P Frame information in the stream. If the stream is determined to comprise the stream tag, whether the packaging layer of the video encoding stream comprises one or more frame tags (e.g., tags with type information added for coding frames) is determined so that the type of each coding frame can be identified quickly. For example, when the video encoding stream comprises the stream tag and further includes frame tags, the stream is generated using the encoding method described herein, and the coding frames of the stream are further provided with the frame tags that comprise the type information of the coding frames. Therefore, the type of each coding frame in the video encoding stream can be identified by directly reading the frame tags of the packaging layer of the video encoding stream to obtain the I Frame information and the refreshment P Frame information in the video encoding stream (e.g., information related to each frame in the index records as described in the process S210).

The process S430 includes: if the steam does not comprise the stream tag, or if the stream comprises the stream tag but not frame tags, analyzing the stream to determine the type of each coding frame in the steam, and obtaining at least the I Frame information. In some embodiments, if the steam does not comprise the stream tag, the video encoding stream is generated using a video encoding method (e.g., a conventional encoding method) other than the method described herein. Then the type of each coding frame cannot be identified directly.

In certain embodiments, if the stream does not comprise the steam tag, the process S430 includes: analyzing the stream to determine the type of each coding frame in the stream, and obtaining the I Frame information or the I Frame information and the refreshment P Frame information. Specifically, the process S430 includes: determining the type of each coding frame according to a reference relation of the coding frame in the stream. For example, the reference relation is as follows: the refreshment P Frame refers to the closest I Frame located before the refreshment P Frame; and the common P Frame refers to the I Frame in a GOP where the common P Frame is located, and the closest frame before the common P Frame. As an example, the process S430 includes: obtaining related I Frame information and refreshment P Frame information from the corresponding I Frame and the refreshment P Frame based on the type of a particular coding frame.

For example, the type of the coding frame may be determined according to the reference relation among the I Frame, the refreshment I Frame and the common I Frame during analysis of the video encoding stream. The type of each coding frame may be determined according to the reference relation of each coding frame in the stream, where the reference relation is as follows: the refreshment P Frame refers to the closest I Frame located before the refreshment P Frame; and the common P Frame refers to the preceding coding frame adjacent to the common P Frame, and/or the closest I Frame before the common P Frame. Then, the corresponding I Frame information and the refreshment P Frame information are obtained from the corresponding I Frame and the refreshment P Frame related to the coding frame based on the type of the coding frame.

In specific embodiment, the process S430 includes: if the stream comprises the steam tag but is not provided with the frame tags, analyzing the stream to determine the type of each coding frame in the stream, and obtaining the I Frame information and the refreshment P Frame information. Specifically, the process S430 includes: obtaining I Frame information and the refreshment P Frame information from the corresponding I Frame and the refreshment P Frame related to each coding frame according to the determined type of the coding frame in the stream that comprises the stream tag. If the stream comprises the stream tag but is not provided with the frame tags, the stream is generated using the encoding method described herein. The video encoding stream includes I Frame, refreshment P Frame and common P Frame, and a stream tag (but not frame tags) is added in the encoding process. Since the type of each coding frame can be definitely determined, one or more corresponding coding frames (e.g., I Frame, refreshment P Frame, etc.) can be found according to the types, and corresponding I Frame information and refreshment P Frame information can be extracted to improve the analysis efficiency. As such, the I Frame information and the refreshment P Frame information are obtained by analyzing the video encoding stream.

The process S440 includes creating one or more indices for storage based on the obtained I Frame information and the refreshment P Frame information. Particularly, index node information of each frame obtained in the above step may be taken as an index record, and the one or more indices is created for all the index records according to the existing data structure and storage access. For example, the obtained I Frame information and the refreshment P Frame information are taken as the index records of index nodes to create the one or more indices for storage.

In one embodiment, the process S440 includes recording relevant information of the coding frames of different types, and creating the index node information, (e.g., index records). For example, I Frame index node information, and refreshment P Frame index node information are recorded to form the index records. In the index records, the recorded I Frame index node information or the I Frame information includes but is not limited to: a coding frame type (e.g., I Frame), I Frame position, a timestamp and a frame identification number. As an example, the recorded refreshment P Frame index node information or the refreshment P Frame information includes but is not limited to: a coding frame type (e.g., refreshment P Frame), refreshment P Frame position, a timestamp, a frame identification number, as well as a position and length of the reference I Frame. The reference I Frame may correspond to the closest I Frame before the refreshment P Frame.

In some embodiments, the process S440 includes, recording the index node information of the frames of various types to form the index records for index creation (e.g., an index table) and storage. For example, in the process S430, only the I Frame information may be obtained as index node information to improve the analysis efficiency. In specific embodiments, since index node information or each index record comprises the position information, the timestamp information and the number information of each frame, coding frames in the video encoding stream can be located quickly. For example, the positions of an I Frame and a refreshment P Frame can be determined directly in the one or more indices, and the position of a common P Frame is indirectly determined using the I Frame and/or the refreshment P Frame adjacent to the common P Frame. The one or more indices may be stored together with the video encoding stream on a server side or on a terminal side.

In certain embodiments, the one or more indices may be created regardless of whether the video encoding stream is generated using the video encoding method described herein (e.g., the method 400 as shown in FIG. 4). If the video encoding stream comprises a stream tag and frame tags, I Frame information and refreshment P Frame information can be obtained more easily, the one or more indices may be created more quickly, and the positions of the I Frame and the refreshment P Frame in the stream may be determined more quickly.

Figure 6:
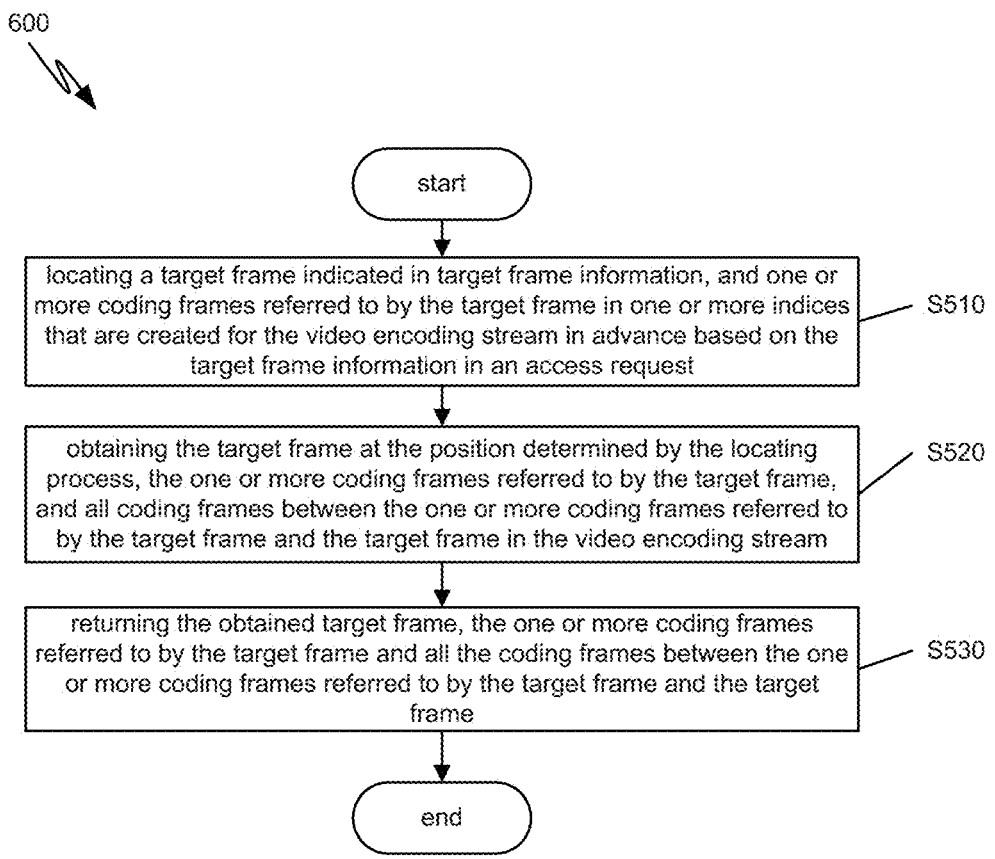
FIG. 6 is an example flow diagram showing a method for accessing a video encoding stream according to one embodiment of the present invention.

FIG. 6 is an example flow diagram showing a method for accessing a video encoding stream according to one embodiment of the present invention. For example, upon receiving a request of accessing a target frame in a video encoding stream after one or more indices are created, the video coding system 104 implements the method 600 to perform inquiry of node information of the target frame and one or more coding frames referred to by the target frame in the indices according to target frame information (e.g., relevant information of the target frame). For example, the video encoding stream and the one or more indices are stored on a server side, and a terminal, as a data decoding end, may access the server.

As shown in FIG. 6, the process S510 includes: locating a target frame indicated in target frame information, and one or more coding frames referred to by the target frame in one or more indices that are created for the video encoding stream in advance based on the target frame information in an access request. For example, the one or more coding frames referred to by the target frame may comprise an I Frame, a refreshment P Frame, and/or a common P Frame. Particularly as described in the process S210, the accessed stream may be generated using the encoding method described herein (e.g., the method 400) which can reduce decoding cost effectively, and the one or more indices may be generated by the index storage method described herein (e.g., the method 500) which can simplify a location process and quickly achieve random access.

In some embodiments, the access request received by the server from the terminal is provided with the target frame information. For example, the target frame information comprises at least one of a frame type, a frame position, a frame identification number and a timestamp. The server locates index records of the target frame and the one or more coding frames referred to by the target frame in the indices according to the target frame information. That is to say, the server finds the corresponding node information/records of the target frame and the one or more coding frames referred to by the target frame in the one or more indices, so as to directly or indirectly to obtain the frame-related information (e.g., position information) in the records.

Whether an index node (e.g., the index node matched with the position, the frame identification number, and/or the timestamp of the target frame) that matches with the target frame information exists in the index records is determined. If an index node that matches with the target frame information exists in the index records, the index node is located to achieve the locating of the target frame. In addition, the index node that matches with the target frame information is used to locate one or more index nodes of the one or more coding frames referred to by the target frame. If an index node that matches with the target frame information does not exist in the index records, an index node of a preceding coding frame closest to the position, the frame identification number and/or the time-stamp of the target frame is located.

Further, if the frame type in the target frame information indicates that the target frame is an I Frame or a refreshment P Frame, relevant index records (e.g., index node information) may be found more quickly and directly from the indices to determine the positions of the target frame and the one or more coding frames referred to by the target frame. For example, the index node of the I Frame referred to by the refreshment P Frame is located based on the position and length of the I Frame recorded in the index node of the refreshment P Frame. If the target frame is a common P Frame, the positions in the index record of a preceding coding frame adjacent to the target frame and in the index record of the subsequent coding frame are found from the one or more indices, and the position of the target frame is determined based on the positions of the preceding coding frame and the subsequent coding frame. For example, if the target frame is a common P Frame, and has no record in the one or more indices, but the refreshment P Frame and the I Frame adjacent to the common P Frame can be determined according to the position, the number and the timestamp of the common P Frame, then the common P Frame and the coding frame referred to by the common P Frame can be located indirectly. In specific embodiments, the locating process may be carried out using a location algorithm (e.g., a bisection method, a sequential search method, etc.).

The process S520 includes obtaining the target frame at the position determined by the locating process, the one or more coding frames referred to by the target frame, and all coding frames between the one or more coding frames referred to by the target frame and the target frame in the video encoding stream based on the locating process (e.g., as described in the process S220). Particularly, the server may extract (obtain) the target frame and the one or more coding frames referred to by the target frame in the video encoding stream according to the determined position of the target frame and the coding frames in the one or more indices (e.g., positions or relevant position information of the located target frame and the one or more coding frames referred to by the target frame).

For example, if the target frame is an I Frame, the one or more coding frames referred to by the target frame correspond to the target frame itself. The position of the I Frame in the video encoding stream may be determined according to the record in the one or more indices, and the target frame (i.e., the I frame) is directly obtained from the video encoding stream.

As an example, if the one or more coding frames referred to by the target frame comprise only an I Frame, the positions of the target frame in the video encoding stream and the closest frame located before the target frame may be determined according to the record in the one or more indices, and the target frame and the closest I Frame located before the target frame may be obtained from the video encoding stream.

For example, if the one or more coding frames referred to by the target frame comprise an I Frame and a refreshment P Frame, the positions of the target frame in the video encoding stream, the closest refreshment P Frame located before the target frame, and the closest I Frame located before the refreshment P Frame may be determined according to the one or more indices, and the target frame, the closest refreshment P Frame located before the target frame, and the closest I Frame located before the refreshment P Frame may be obtained from the video encoding stream.

As an example, if the one or more coding frames referred to by the target frame comprise an I Frame and a common P Frame, the positions of the target frame in the video encoding stream and the closest I Frame located before the target frame may be determined according to the one or more indices, and the target frame, the closest I Frame located before the target frame and one or more common P Frames located between the I Frame and the target frame may be obtained from the video encoding stream.

For example, if the one or more coding frames referred to by the target frame comprise an I Frame, a refreshment P Frame and a common P Frame, the positions of the target frame in the video encoding stream, the closest refreshment P Frame located before the target frame, and the closest I Frame located before the refreshment P Frame may be determined according to the one or more indices. The target frame, the closest refreshment P Frame located before the target frame, the closest I Frame located before the refreshment P Frame and one or more common P Frames located between the refreshment P Frame and the target frame may be obtained from the video encoding stream.

The process S530 includes returning the obtained target frame, the one or more coding frames referred to by the target frame and all the coding frames between the one or more coding frames referred to by the target frame and the target frame (e.g., as described in the process S230). Particularly, the server returns the obtained target frame and the one or more coding frames referred to by the target frame to the terminal. For example, if the server only transmits the coding frames referred to (e.g., directly and/or indirectly) by the target frame, rather than the coding frames not referred to by the target frame, to the terminal, the bit rate is relatively low during transmission, so that the problem related to insufficient bandwidth during the transmission is ameliorated. As an example, to further reduce the bit rate, the transmission of common P Frames may be given up first, and then the transmission of refreshment P Frames may be given up so as to further reduce the number of the coding frames to be transmitted.

Figure 7:
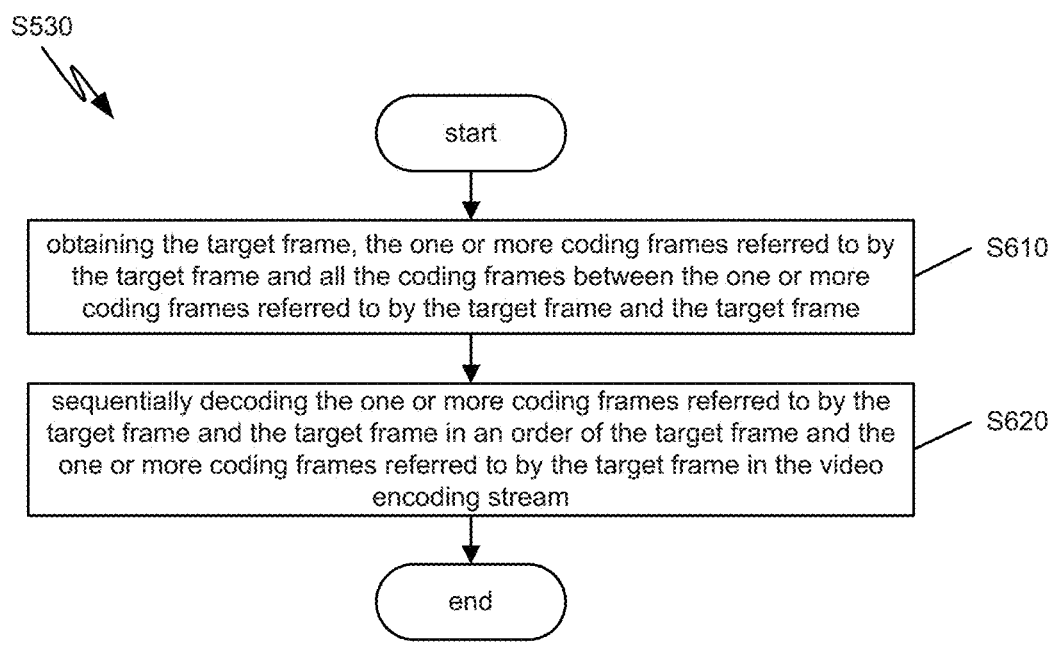
FIG. 7 is an example flow diagram showing a process of returning certain coding frames according to one embodiment of the present invention.

FIG. 7 is an example flow diagram showing the process S530 of returning certain coding frames according to one embodiment of the present invention. As shown in FIG. 7, the process S610 includes obtaining the target frame, the one or more coding frames referred to by the target frame and all the coding frames between the one or more coding frames referred to by the target frame and the target frame returned from the video encoding stream.

Particularly, the terminal obtains the target frame and the one or more coding frames referred to by the target frame returned by the server. For example, the one or more coding frames referred to by the target frame may comprise an I Frame, a refreshment P Frame, and/or a common P Frame.

The process S620 includes sequentially decoding the one or more coding frames referred to by the target frame and the target frame in an order (e.g., based on frame identification numbers, or timestamps) of the target frame and the one or more coding frames referred to by the target frame in the video encoding stream. The terminal may carry out decoding in sequence based on the target frame and the one or more coding frames referred to by the target frame. For example, the terminal may decode an I Frame corresponding to the obtained target frame and then the coding frames of other types corresponding to the obtained target frame (e.g., including the target frame), which is similar to the decoding described in the process S230, achieving low-cost decoding and quick acquisition of video data (e.g., content/data of the decoded target frame). Further, a plurality of target frames may be decoded one by one to obtain video data corresponding to the accessed video encoding stream.

In some embodiments, the server transmits the obtained target frame and the one or more coding frames referred to by the target frame to the terminal that requests to access the target frame. That is to say, the server returns a result of an access request (e.g., the corresponding target frame in the video encoding stream). In certain embodiments, the terminal may receive the target frame and the one or more coding frames referred to by the target frame from the server. In addition, the terminal may also sequentially decode the one or more coding frames and the target frame according to the frame identification numbers or timestamps of the target frame and the one or more coding frames to obtain a final decoded target frame. Since the terminal only obtains the coding frames referred to (e.g., directly and/or indirectly) by the target frame, the terminal obtains fewer coding frames, and the decoding cost is relatively low. Further, in order to reduce the decoding cost, the terminal may only decode the I Frame and the refreshment P Frame, or the terminal may only decode the I Frame to permit lower energy consumption.

FIG. 8 is an example diagram showing a video encoding stream according to one embodiment of the present invention. As shown in FIG. 8. I1 and I2 refer to I Frames, Pn1, Pm1 and Pj1 are refreshment P Frames, and others are common P Frames. The closest frame before a common P Frame is an I Frame, a refreshment P Frame or a common P Frame. During the creation of one or more indices, the indices record information related to I Frames, Pn1 frame and Pm1 frame. When a Pn3 frame is accessed, the Pn3 frame, the Pn1 frame and the I1 frame are located in sequence. After the locating process, the I1, Pn1, Pn2 and Pn3 frames are obtained from the video encoding stream. The I1 frame can be decoded independently. The Pn1, Pn2 and Pn3 frames that include picture difference information cannot be decoded independently, and may be decoded using one or more preceding frames. Thus, the Pn3 frame may be decoded by decoding the I1, Pn1, Pn2 and Pn3 frames in sequence. Compared with the conventional stream access methods, the Pn3 frame can be decoded without obtaining the P11 and P12 frames, and common P Frames between the P12 and Pn1 frames, thereby reducing the decoding cost effectively.

Figure 9:
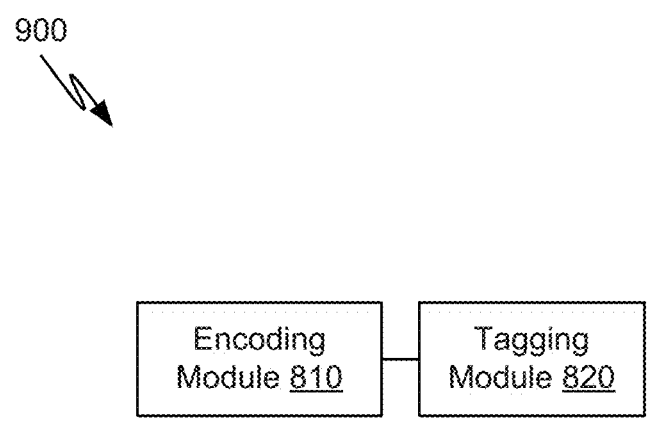
FIG. 9 is an example diagram showing a video encoding device according to one embodiment of the present invention.

FIG. 9 is an example diagram showing a video encoding device according to one embodiment of the present invention. As shown in FIG. 9, the device 900 comprises: an encoding module 810 configured to encode video data based on a preset encoding algorithm to obtain a video encoding stream that comprises a plurality of coding frames.

In some embodiments, picture data in the video data is encoded using an intra-frame prediction encoding algorithm to obtain an I Frame. As an example, the picture data in the video data is encoded using a first intra-frame prediction encoding algorithm, and a refreshment P Frame is obtained, wherein the refreshment P Frame refers to the closest I Frame located before the refreshment P Frame. As another example, the picture data in the video data is encoded using a second intra-frame prediction encoding algorithm, and a common P Frame is obtained, wherein the common P Frame refers to a preceding coding frame adjacent to the common P Frame, and/or the closest I Frame located before the common P Frame. For example, the video encoding stream comprises a plurality of GOPs. Each GOP comprises an I Frame, as well as a refreshment P Frame and a common P Frame that follow the I Frame and have direct or indirect reference relation with the I Frame. In specific embodiments, the encoding module 810 implements the process S310.

As shown in FIG. 9, the device 900 comprises: a tag module 820 configured to add a stream tag for the video encoding stream, and/or a frame tag for each coding frame in the video encoding stream, where the stream tag comprises information characterizing whether the tag is added into the stream, and a frame tag comprises type information of a coding frame. In specific embodiments, the tag module 820 implements the process S320.

Figure 10:
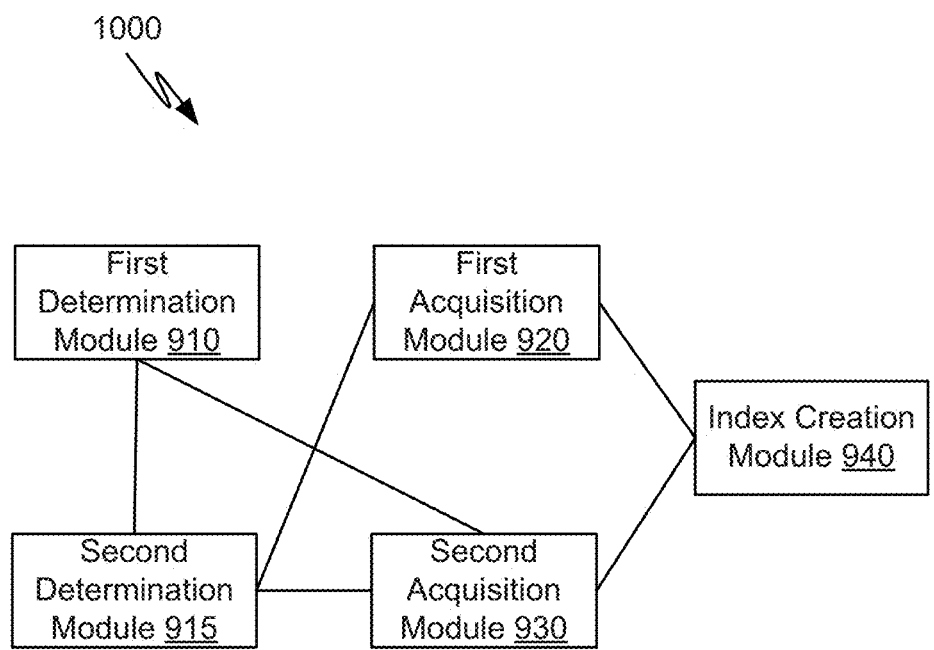
FIG. 10 is an example diagram showing an index storage device according to one embodiment of the present invention.

FIG. 10 is an example diagram showing an index storage device according to one embodiment of the present invention. As shown in FIG. 10, the device 1000 comprises: a first determination module 910 configured to obtain a video encoding stream to be determine whether the stream comprises a stream tag. In specific embodiments, the first determination module 910 implements the process S410.

The device 1000 further comprises: a second determination module 915 configured to determine whether one or more coding frames in the stream have frame tags if the stream comprises the stream tag. In specific embodiments, the second determination module 915 implements the process S415.

The device 1000 further comprises: a first acquisition module 920 configured to, if the stream includes one or more frame tags of one or more coding frames, read the frame tags in the stream to obtain I Frame information and refreshment P Frame information in the stream. In specific embodiments, the first acquisition module 920 implements the process S420.

The device 1000 further comprises: a second acquisition module 930 configured to, if the steam does not comprise the stream tag, or if the stream comprises the stream tag but not frame tags, analyze the stream to determine the type of each coding frame in the steam and obtain at least the I Frame information. For example, the type of each coding frame is determined according to reference relation of each coding frame in the stream if the stream does not comprise the steam encode. The reference relation is as follows: a refreshment P Frame refers to the closest I Frame located before the refreshment P Frame; and a common P Frame refers to a preceding coding frame adjacent to the common P Frame and/or the closest I Frame located before the common P Frame. The corresponding I Frame information and the refreshment P Frame information are obtained from the corresponding I Frame and the refreshment P Frame based on the frame types.

As an example, if the stream comprises the steam tag but is not provided with the frame tags, the corresponding I Frame information and the refreshment P Frame information are obtained from the corresponding I Frame and the refreshment P Frame according to the determined type of each coding frame in the stream that comprises the stream tag. The I Frame information may comprise a position, a timestamp and/or a frame identification number of the I Frame, and the refreshment P Frame information may comprise a position, a timestamp and/or a frame identification number of the refreshment P Frame, as well as the position and length of the I Frame referred to by the refreshment P Frame. In specific embodiments, the second acquisition module 930 implements the process S430.

The device 1000 further comprises: an index creation module 940 configured to create one or more indices for storage according to the obtained I Frame information and the refreshment P Frame information. For example, the obtained I Frame information and the refreshment P Frame information are taken as index records of index nodes to create the one or more indices for storage. In specific embodiments, the index creation module 940 implements the process S440.

Figure 11:
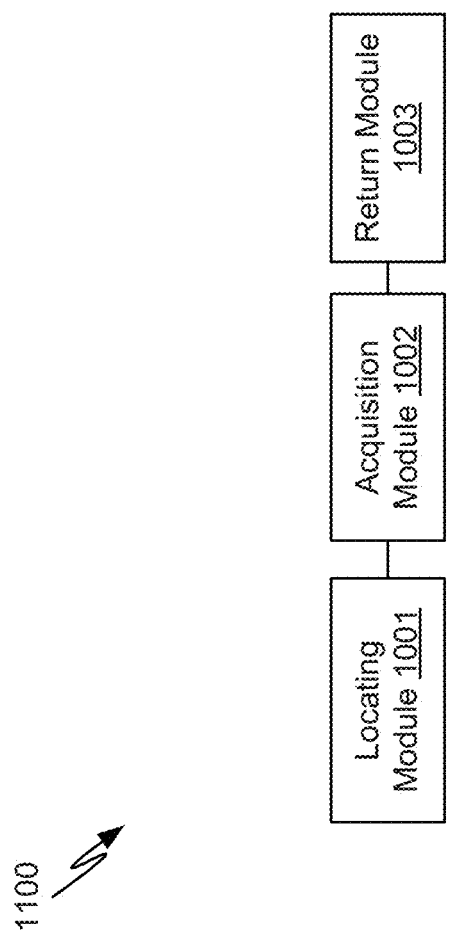
FIG. 11 is an example diagram showing a stream-access device according to one embodiment of the present invention.

FIG. 11 is an example diagram showing a stream-access device according to one embodiment of the present invention. As shown in FIG. 11, the device 1100 comprises: a locating module 1001 configured to locate a target frame in a video encoding stream indicated in target frame information, and one or more coding frames referred to by the target frame in one or more indices that are created for the video encoding stream in advance based on the target frame information in an access request. For example, the one or more coding frames referred to by the target frame may comprise an I Frame, a refreshment P Frame, and/or a common P Frame. In some embodiments, the stream may be obtained using an encoding method described herein (e.g., the method 400) employed by an encoding device (e.g., the device 900).

In certain embodiments, video data is encoded using a preset encoding algorithm to obtain the video encoding stream that comprises a plurality of coding frames (e.g., as described for the encoding module 810 and the process S310). For example, picture data in the video data is encoded using an intra-frame prediction encoding algorithm to obtain an I Frame. As an example, the picture data in the video data is encoded using a first intra-frame prediction encoding algorithm, and a refreshment P Frame is obtained, wherein the refreshment P Frame refers to the closest I Frame located before the refreshment P Frame. As another example, the picture data in the video data is encoded using a second intra-frame prediction encoding algorithm, and a common P Frame is obtained, wherein the common P Frame refers to a preceding coding frame adjacent to the common P Frame, and/or the closest I Frame located before the common P Frame.

In some embodiments, a stream tag can be added for the video encoding stream, and/or a frame tag is added for each coding frame in the video encoding stream (e.g., as described for the tag module 820 and the process S320). A frame tag may comprise type information of a coding frame. The stream may comprise a plurality of GOPs. Each GOP comprises a plurality of coding frames having reference relation (e.g., as shown in FIG. 8). In certain embodiments, the one or more indices for locating may be created by an index storage device (e.g., the device 1000) and an index storage method (e.g., the method 500).

In specific embodiments, whether the video encoding stream to be accessed comprises a stream tag is determined (as described for the first determination module 910 and the process S410). If the video encoding stream to be accessed comprises a stream tag, whether a coding frame in the stream has a frame tag (e.g., as described for the second determination module 915 and the process S415). The frame tag of each coding frame in the stream is read to obtain I Frame information and refreshment P Frame information in the stream if the coding frame has a frame tag (e.g., as described for the first acquisition module 920 and the process S420). If the steam does not comprise the stream tag, or if the stream comprises the stream tag but not the frame tags, the stream is analyzed to determine the type of each coding frame in the steam and obtain the I Frame information and the refreshment P Frame information (e.g., as described for the second acquisition module 930 and the process S430).

For example, the type of each coding frame is determined according to reference relation of each coding frame in the stream if the stream does not comprise the steam encode. The reference relation is as follows: a refreshment P Frame refers to the closest I Frame located before the refreshment P Frame; and a common P Frame refers to a preceding coding frame adjacent to the common P Frame and/or the closest I Frame located before the common P Frame. The corresponding I Frame information and the refreshment P Frame information are obtained from the corresponding I Frame and the refreshment P Frame based on the frame types.

In some embodiments, if the stream comprises the steam tag but is not provided with the frame tags, the corresponding I Frame information and the refreshment P Frame information are obtained from the corresponding I Frame and the refreshment P Frame during the stream analysis according to the determined type of each coding frame in the stream that comprises the stream tag. In specific embodiments, the obtained I Frame information and the refreshment P Frame information are taken as index records to create the one or more indices for storage (e.g., as described for the index creation module 940 and the process S440).

For example, the target frame information comprises one of a position, a frame identification number and a timestamp of a target frame. Whether an index node that matches with the target frame information exists in the index records is determined. If an index node that matches with the target frame information exists in the index records, the index node is located to achieve the locating of the target frame. In addition, the index node that matches with the target frame information is used to locate one or more index nodes of the one or more coding frames referred to by the target frame. If an index node that matches with the target frame information does not exist in the index records, an index node of a preceding coding frame closest to the position, the frame identification number and/or the time-stamp of the target frame is located (e.g., as described in the process S510). In specific embodiments, the locating module 1001 implements the process S210 and/or the process S510.

As shown in FIG. 11, the device 1100 further comprises: an acquisition module 1002 configured to obtain the target frame at the position determined by the locating process, the one or more coding frames referred to by the target frame, and all coding frames between the one or more coding frames referred to by the target frame and the target frame in the video encoding stream based on the locating process. Particularly, if the target frame is an I Frame, the one or more coding frames referred to by the target frame correspond to the target frame itself. The position of the I Frame in the video encoding stream may be determined according to the record in the one or more indices, and the target frame (i.e., the I frame) is obtained from the video encoding stream.

As an example, if the one or more coding frames referred to by the target frame comprise only an I Frame, the positions of the target frame in the video encoding stream and the closest frame located before the target frame may be determined according to the record in the one or more indices, and the target frame and the closest I Frame located before the target frame may be obtained from the video encoding stream.

For example, if the one or more coding frames referred to by the target frame comprise an I Frame and a refreshment P Frame, the positions of the target frame in the video encoding stream, the closest refreshment P Frame located before the target frame, and the closest I Frame located before the refreshment P Frame may be determined according to the one or more indices, and the target frame, the closest refreshment P Frame located before the target frame, and the closest I Frame located before the refreshment P Frame may be obtained from the video encoding stream.

As an example, if the one or more coding frames referred to by the target frame comprise an I Frame and a common P Frame, the positions of the target frame in the video encoding stream and the closest I Frame located before the target frame may be determined according to the one or more indices, and the target frame, the closest I Frame located before the target frame and one or more common P Frames located between the I Frame and the target frame may be obtained from the video encoding stream.

For example, if the one or more coding frames referred to by the target frame comprise an I Frame, a refreshment P Frame and a common P Frame, the positions of the target frame in the video encoding stream, the closest refreshment P Frame located before the target frame, and the closest I Frame located before the refreshment P Frame may be determined according to the one or more indices, and the closest refreshment P Frame located before the target frame, the closest I Frame located before the refreshment P Frame and one or more common P Frames located between the refreshment P Frame and the target frame may be obtained from the video encoding stream. In specific embodiments, the acquisition module 1002 implements the process S220 and/or the process S520.

As shown in FIG. 11, the device 1100 further comprises: a return module 1003 configured to return the obtained target frame, the one or more coding frames referred to by the target frame and all the coding frames between the one or more coding frames referred to by the target frame and the target frame.

In certain embodiments, a process of returning and decoding certain coding frames is as shown in FIG. 7. For example, the target frame, the one or more coding frames referred to by the target frame, all the coding frames between the target frame and the coding frame referred to by the target frame returned from the video encoding stream are obtained. The one or more coding frames referred to by the target frame may comprise an I Frame, a refreshment P Frame, and/or a common P Frame (e.g., as described in the process S610). The obtained coding frames referred to by the target frame and the target frame are sequentially decoded according to the frame identification numbers or the timestamps of the target frame and the one or more coding frames referred to by the target frame in the video encoding stream (e.g., as described in the process S620). In specific embodiments, the return module 1003 implements the process S230 and/or the process S530.

Figure 12:
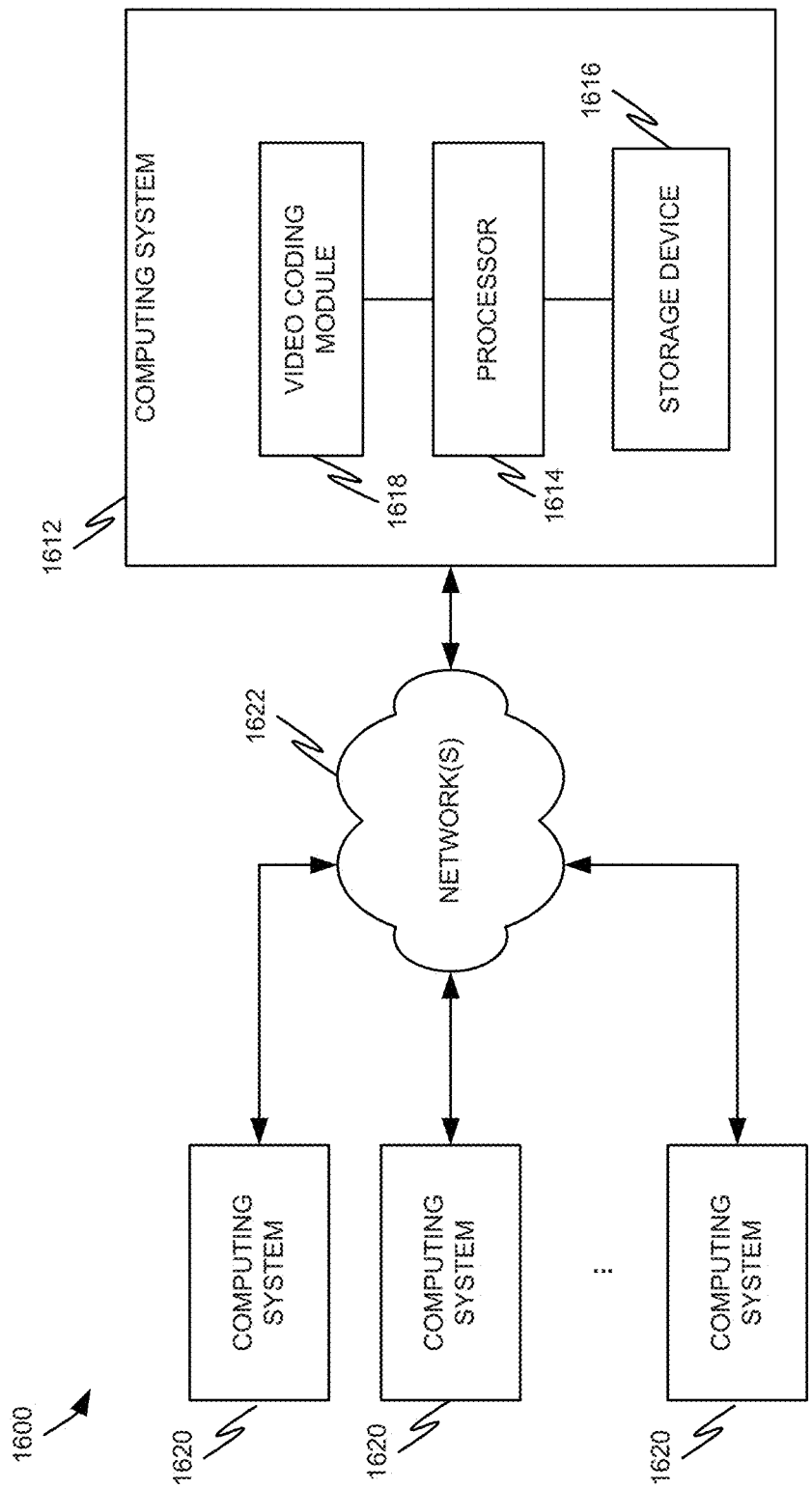
FIG. 12 is an example diagram for a video coding system, according to one embodiment of the present invention.

FIG. 12 is an example diagram for a video coding system, according to one embodiment of the present invention. As shown in FIG. 12, the system 1600 includes a computing system 1612 which contains a processor 1614, a storage device 1616 and a video coding module 1618. The computing system 1612 includes any suitable type of computing device (e.g., a server, a desktop, a laptop, a tablet, a mobile phone, etc.) that includes the processor 1614 or provide access to a processor via a network or as part of a cloud based application. The video coding module 1618 includes tasks and is implemented as part of a user interface module (not shown in FIG. 12).

Figure 13:
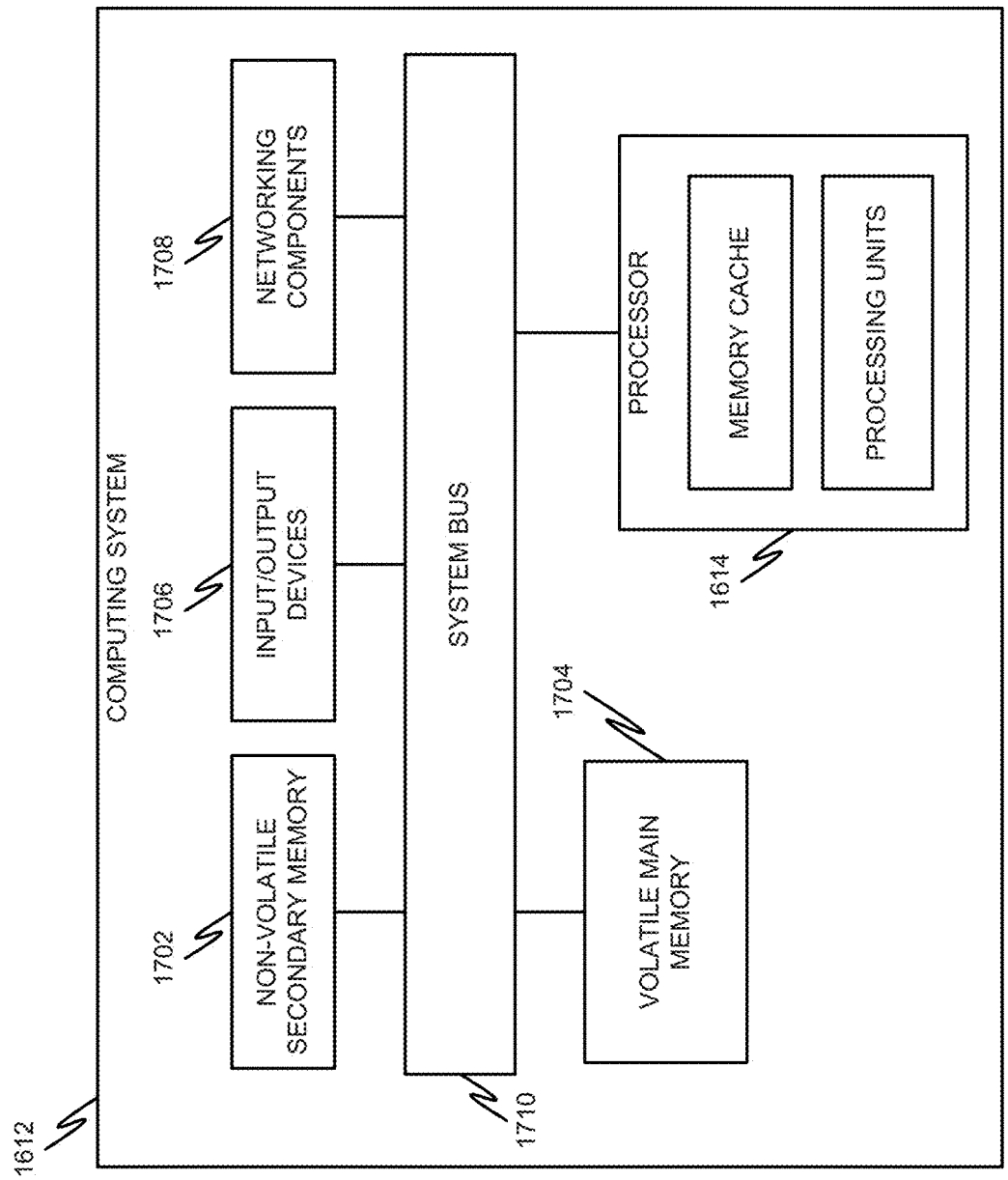
FIG. 13 depicts an example diagram showing a computing system for video coding, according to one embodiment of the present invention.

FIG. 13 depicts an example diagram showing a computing system for video coding, according to one embodiment of the present invention. As shown in FIG. 13, the computing system 1612 includes a processor 1614, memory devices 1702 and 1704, one or more input/output devices 1706, one or more networking components 1708, and a system bus 1710. In some embodiments, the computing system 1612 includes the video coding module 1618, and provides access to the video coding module 1618 to a user as a stand-alone computer.

According to some embodiments, the systems, devices and methods described herein can be configured to add a stream tag in a packaging layer of a video encoding stream so that different locating methods may be adopted for the particular video encoding stream and other streams. For example, the systems, devices and methods described herein can be configured to quickly identify a video encoding stream in various applications, such as real-time stream preview, storage playback, local file location, reverse play, etc.

According to certain embodiments, the systems, devices and methods described herein can be configured to add a frame tag for each coding frame in the video encoding stream at the packaging layer to differentiate I Frames, refreshment P Frames and common P Frames to quickly analyze video frame types and avoid analyzing information of more encoding layers.

According to specific embodiments, the systems, devices and methods described herein can be configured to reduce occurrence frequency in unit time of I Frames that have maximum data length in the video encoding stream to decrease a bit rate so that requirements for bandwidth, storage, etc. can be lessened for same resolution and picture quality. According to certain embodiments, the systems, devices and methods described herein can be configured to record frame types in an index storage structure and, during playback locating, accelerate the locating process according to frame reference relation based on a quick random access principle.

According to some embodiments, the systems, devices and methods described herein can be configured to, during remote data playback, discard common P Frames and then refreshment P Frames based on frame types at a transmission end according to bandwidth conditions and a quick play speed to reduce bandwidth load. According to certain embodiments, the systems, devices and methods described herein can be configured to discard common P Frames preferentially to reduce decoding cost to better achieve quick play or multiple-route play.

According to one embodiment, a method is provided for video encoding. For example, video data is encoded based at least in part on a preset encoding algorithm to obtain a video encoding stream that comprises a plurality of coding frames. A stream tag is added for the video encoding stream, and a frame tag is added for a coding frame in the video encoding stream. The stream tag includes information characterizing whether the stream tag is added into the video encoding stream. The frame tag includes type information of the coding frame.

According to another embodiment, a method is provided for video index storage. For example, a video encoding stream is obtained to determine whether the video encoding stream includes a stream tag. In response to the video encoding stream including the stream tag, whether one or more coding frames in the video encoding stream have frame tags is determined. In response to the video encoding stream including one or more frame tags for the one or more coding frames, the one or more frame tags in the video encoding stream are read to obtain I Frame information and refreshment P Frame information in the video encoding stream. In response to the video encoding steam not including the stream tag, the video encoding stream is analyzed to determine a type of a coding frame in the video encoding steam and at least the I Frame information is obtained. In response to the video encoding stream including the stream tag but not frame tags, the video encoding stream is analyzed to determine the type of the coding frame in the video encoding steam and at least the I Frame information is obtained. One or more indices for storage are created based on the I Frame information and the refreshment P Frame information.

According to yet another embodiment, a method is provided for video access. For example, a target frame and one or more coding frames referred to by the target frame are located using one or more indices that are created for a video encoding stream in advance based at least in part on target frame information in an access request. The one or more coding frames referred to by the target frame include at least one of the following: an I Frame, a refreshment P Frame, and a common P Frame. The target frame, the one or more coding frames referred to by the target frame, and other coding frames between the one or more coding frames referred to by the target frame and the target frame are obtained from the video encoding stream. The target frame, the one or more coding frames referred to by the target frame and the other coding frames between the one or more coding frames referred to by the target frame and the target frame are returned.

In one embodiment, a device for video encoding includes: an encoding module configured to encode video data based on a preset encoding algorithm to obtain a video encoding stream that comprises a plurality of coding frames; and a tag module configured to add a stream tag for the video encoding stream, and add a frame tag for a coding frame in the video encoding stream. The stream tag includes information characterizing whether the stream tag is added into the video encoding stream; and the frame tag includes type information of the coding frame.

In another embodiment, a device for video index storage includes: a first determination module configured to obtain a video encoding stream to determine whether the video encoding stream includes a stream tag; a second determination module configured to, in response to the video encoding stream including the stream tag, determine whether one or more coding frames in the video encoding stream have frame tags; a first acquisition module configured to, in response to the video encoding stream including one or more frame tags for the one or more coding frames, read the one or more frame tags in the video encoding stream to obtain I Frame information and refreshment P Frame information in the video encoding stream; a second acquisition module configured to: in response to the video encoding steam not including the stream tag, analyze the video encoding stream to determine a type of a coding frame in the video encoding steam; and obtain at least the I Frame information; in response to the video encoding stream including the stream tag but not frame tags, analyze the video encoding stream to determine the type of the coding frame in the video encoding steam; and obtain at least the I Frame information; and an index creation module configured to create one or more indices for storage based on the I Frame information and the refreshment P Frame information.

In yet another embodiment, a device for video access includes: a locating module configured to locate a target frame and one or more coding frames referred to by the target frame using one or more indices that are created for a video encoding stream in advance based at least in part on target frame information in an access request; wherein the one or more coding frames referred to by the target frame include at least one of the following: an I Frame, a refreshment P Frame, and a common P Frame; an acquisition module configured to obtain the target frame, the one or more coding frames referred to by the target frame, and other coding frames between the one or more coding frames referred to by the target frame and the target frame in the video encoding stream; and a return module configured to return the target frame, the one or more coding frames referred to by the target frame and the other coding frames between the one or more coding frames referred to by the target frame and the target frame.

According to one embodiment, a system for video encoding includes: one or more data processors; and one or more non-transitory computer-readable storage media encoded with instructions for commanding the data processors to execute operations including: encoding video data based at least in part on a preset encoding algorithm to obtain a video encoding stream that comprises a plurality of coding frames;

adding a stream tag for the video encoding stream; and adding a frame tag for a coding frame in the video encoding stream. The stream tag includes information characterizing whether the stream tag is added into the video encoding stream; and the frame tag includes type information of the coding frame.

According to another embodiment, a system for video index storage includes: one or more data processors; and one or more non-transitory computer-readable storage media encoded with instructions for commanding the data processors to execute operations including: obtaining a video encoding stream to determine whether the video encoding stream includes a stream tag; in response to the video encoding stream including the stream tag, determining whether one or more coding frames in the video encoding stream have frame tags; in response to the video encoding stream including one or more frame tags for the one or more coding frames, reading the one or more frame tags in the video encoding stream to obtain I Frame information and refreshment P Frame information in the video encoding stream; in response to the video encoding steam not including the stream tag, analyzing the video encoding stream to determine a type of a coding frame in the video encoding steam and obtaining at least the I Frame information; in response to the video encoding stream including the stream tag but not frame tags, analyzing the video encoding stream to determine the type of the coding frame in the video encoding steam and obtaining at least the I Frame information; and creating one or more indices for storage based on the I Frame information and the refreshment P Frame information.

According to yet another embodiment, a system for video access includes: one or more data processors; and one or more non-transitory computer-readable storage media encoded with instructions for commanding the data processors to execute operations including: locating a target frame and one or more coding frames referred to by the target frame using one or more indices that are created for a video encoding stream in advance based at least in part on target frame information in an access request; wherein the one or more coding frames referred to by the target frame include at least one of the following: an I Frame, a refreshment P Frame, and a common P Frame; obtaining the target frame, the one or more coding frames referred to by the target frame, and other coding frames between the one or more coding frames referred to by the target frame and the target frame in the video encoding stream; and returning the target frame, the one or more coding frames referred to by the target frame and the other coding frames between the one or more coding frames referred to by the target frame and the target frame.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail. Also, the diagrams in the present disclosure are merely examples, which should not unduly limit the scope of the claims. One of ordinary skill in the art would recognize many variations, alternatives, and modifications.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems, devices and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for video index storage, the method comprising:
    obtaining, using one or more processors, a video encoding stream to determine whether the video encoding stream includes a stream tag, wherein the stream tag identifies a type of encoding method used for the video encoding stream;
    in response to the video encoding stream including the stream tag, determining, using the one or more processors, whether one or more coding frames in the video encoding stream have frame tags;
    in response to the video encoding stream including one or more frame tags for the one or more coding frames, reading, using the one or more processors, the one or more frame tags in the video encoding stream to obtain I Frame information and refreshment P Frame information in the video encoding stream, wherein a refreshment P Frame is a modified type of P frame that is encoded with reference to a preceding I Frame closest to the refreshment P Frame and does not refer to a preceding common P frame;
    in response to the video encoding stream not including the stream tag, analyzing, using the one or more processors, the video encoding stream to
    determine a type of a coding frame in the video encoding stream; and
        obtaining at least the I Frame information;
    in response to the video encoding stream including the stream tag but not frame tags, analyzing, using the one or more processors, the video encoding stream to
    determine the type of the coding frame in the video encoding stream; and
        obtaining at least the I Frame information; and
    creating, using the one or more processors, one or more indices for storage based on the I Frame information and the refreshment P Frame information,
    wherein the frame tag comprises a first value if the coding frame is the I-frame, the frame tag comprises a second value if the coding frame is the refreshment P-frame, and the frame tag comprises a third value if the coding frame is the P-frame other than the refreshment P-frame.

2. The method of claim 1, wherein in response to the video encoding stream not including the stream tag, analyzing the video encoding stream to determine a type of a coding frame in the video encoding stream and obtaining the I Frame information includes:
    determining the type of the coding frame based at least in part on a reference relation of the coding frame in the video encoding stream;
    wherein the reference relation includes: a refreshment P Frame referring to a closest I Frame located before the refreshment P Frame, and a common P Frame referring to a preceding coding frame adjacent to the common P Frame or a closest I Frame located before the common P Frame;
    obtaining the I Frame information and the refreshment P Frame information from a corresponding I Frame and a corresponding refreshment P Frame based at least in part on the determined type of the coding frame.

3. The method of claim 2, wherein creating the one or more indices for storage based on the I Frame information and the refreshment P Frame information includes:
    establishing index records for index nodes based at least in part on the I Frame information and the refreshment P Frame information to create the one or more indices for storage.

4. The method as in one of claim 1, wherein:
    the I Frame information includes at least one of the following: an I Frame position, an I Frame timestamp and an I Frame identification number; and
    the refreshment P Frame information includes at least one of the following: a refreshment P Frame position, a refreshment P Frame timestamp, a refreshment P Frame identification number, a position of an I Frame that the refreshment P Frame refers to, and a length of the I Frame that the refreshment P Frame refers to.

5. A processor-implemented method for video access, the method comprising:
    locating, using the one or more processors, a target frame and one or more coding frames referred to by the target frame using one or more indices that are created for a video encoding stream in advance based at least in part on target frame information in an access request;
    wherein the video encoding stream includes, an I Frame encoded with reference to itself, a refreshment P Frame encoded only with reference to a preceding I Frame closest to the refreshment P Frame, and a common P Frame encoded with reference to a preceding coding frame adjacent to the common P Frame and a preceding I Frame closest to the common P Frame;
    wherein the one or more coding frames referred to by the target frame include at least one of the I Frame, the refreshment P Frame, and the common P Frame;
    obtaining, using the one or more processors, the target frame, the one or more coding frames referred to by the target frame, and other coding frames between the one or more coding frames referred to by the target frame and the target frame in the video encoding stream; and
    returning the target frame, the one or more coding frames referred to by the target frame and the other coding frames between the one or more coding frames referred to by the target frame and the target frame.

6. The method of claim 5, wherein the video encoding stream includes a stream tag or one or more frame tags for one or more coding frames.

7. The method as in one of claim 5, wherein:
the one or more indices include one or more index records;
one or more index nodes in the one or more index records include the I Frame information and the refreshment P Frame information;
the I Frame information includes at least one of the following: an I Frame position, an I Frame timestamp and an I Frame identification number; and
the refreshment P Frame information includes at least one of the following: a refreshment P Frame position, a refreshment P Frame timestamp, a refreshment P Frame identification number, a position of an I Frame that the refreshment P Frame refers to, and a length of the I Frame that the refreshment P Frame refers to.

8. The method of claim 7, wherein:
the target frame information includes at least one of the following: a target frame position, a target frame identification number, and a target frame time stamp; and
locating the target frame and the one or more coding frames referred to by the target frame using the one or more indices that are created for the video encoding stream in advance based at least in part on the target frame information in the access request includes:
determining whether a first index node that matches with the target frame information exists in the one or more index records;
in response to the first index node that matches with the target frame information existing in the index records,
locating the first index node; and
locating one or more second index nodes of the one or more coding frames referred to by the target frame; and
in response to the first index node that matches with the target frame information not existing in the index records, locating a third index node of a preceding coding frame based at least in part on the target frame information.

9. The method of claim 8, wherein locating the target frame and the one or more coding frames referred to by the target frame using the one or more indices that are created for the video encoding stream in advance based at least in part on the target frame information in the access request includes:
in response to the target frame being an I Frame,
determining a position of the I Frame in the video encoding stream based at least in part on the one or more index records in the one or more indices; and
obtaining the I frame from the video encoding stream;
wherein the one or more coding frames referred to by the target frame correspond to the target frame;
in response to the one or more coding frames referred to by the target frame including only an I Frame,
determining a position of the target frame in the video encoding stream and a position of a closest I Frame located before the target frame based at least in part on the one or more index records in the one or more indices; and
obtaining the target frame and the closest I Frame located before the target frame from the video encoding stream;
in response to the one or more coding frames referred to by the target frame including an I Frame and a refreshment P Frame,
determining a position of the target frame in the video encoding stream, a position of a closest refreshment P Frame located before the target frame, and a position of a closest I Frame located before the refreshment P Frame based at least in part on the one or more index records in the one or more indices; and
obtaining the target frame, the closest refreshment P Frame located before the target frame, and the closest I Frame located before the refreshment P Frame from the video encoding stream;
in response to the one or more coding frames referred to by the target frame including an I Frame and a common P Frame,
determining a position of the target frame in the video encoding stream and a position of a closest I Frame located before the target frame based at least in part on the one or more index records in the one or more indices; and
obtaining the target frame, the closest I Frame located before the target frame and one or more common P Frames located between the closest I Frame located before the target frame and the target frame from the video encoding stream;
in response to the one or more coding frames referred to by the target frame including an I Frame, a refreshment P Frame and a common P Frame,
determining a position of the target frame in the video encoding stream, a position of a closest refreshment P Frame located before the target frame, and a position of a closest I Frame located before the refreshment P Frame may be determined based at least in part on the one or more index records in the one or more indices; and
obtaining the target frame, the closest refreshment P Frame located before the target frame, the closest I Frame located before the refreshment P Frame and one or more common P Frames located between the closest refreshment P Frame and the target frame from the video encoding stream.

10. The method as in one of claim 5, wherein returning the target frame, the one or more coding frames referred to by the target frame and the other coding frames between the one or more coding frames referred to by the target frame and the target frame includes:
obtaining the target frame, the one or more coding frames referred to by the target frame and the other coding frames between the one or more coding frames referred to by the target frame and the target frame;
wherein the one or more coding frames referred to by the target frame include at least one of the following: an I Frame, a refreshment P Frame, and a common P Frame;
sequentially decoding the one or more coding frames referred to by the target frame and the target frame based at least in part on frame identification numbers or timestamps of the target frame and the one or more coding frames referred to by the target frame in the video encoding stream.

* * * * *